United States Patent
Ichihara et al.

(10) Patent No.: US 8,139,759 B2
(45) Date of Patent: Mar. 20, 2012

(54) LINE STATE DETECTING APPARATUS AND TRANSMITTING APPARATUS AND RECEIVING APPARATUS OF BALANCED TRANSMISSION SYSTEM

(75) Inventors: Fumio Ichihara, Chikushi-gun (JP); Akihiro Yamashita, Miyaki-gun (JP); Tsunehiro Hanada, Fukuoka (JP); Mutsuhiko Oishi, Izuka (JP); Toshiyuki Wakisaka, Izuka (JP); Masahiro Maki, Kasuya-gun (JP)

(73) Assignee: Panasonic Corporation, Osaka (JP)

( * ) Notice: Subject to any disclaimer, the term of this patent is extended or adjusted under 35 U.S.C. 154(b) by 1941 days.

(21) Appl. No.: 11/105,573

(22) Filed: Apr. 14, 2005

(65) Prior Publication Data
US 2005/0232412 A1 Oct. 20, 2005

(30) Foreign Application Priority Data

Apr. 16, 2004 (JP) ............... P. 2004-121455
Apr. 16, 2004 (JP) ............... P. 2004-121456

(51) Int. Cl.
*H04M 1/00* (2006.01)
(52) U.S. Cl. ........... 379/404; 379/415; 379/417; 307/90
(58) Field of Classification Search .................. 379/414, 379/399.01–417
See application file for complete search history.

(56) References Cited

U.S. PATENT DOCUMENTS

| | | | | |
|---|---|---|---|---|
| 6,040,778 A | * | 3/2000 | Hopkins et al. ............. | 340/650 |
| 6,052,420 A | * | 4/2000 | Yeap et al. ................ | 375/346 |
| 6,459,739 B1 | * | 10/2002 | Vitenberg ................. | 375/258 |
| 6,667,685 B2 | | 12/2003 | Wasaki | |
| 7,256,662 B2 | | 8/2007 | Wasaki | |
| 2002/0063474 A1 | * | 5/2002 | Wasaki et al. ............ | 307/89 |
| 2004/0131123 A1 | * | 7/2004 | Maki et al. ............... | 375/257 |
| 2005/0053229 A1 | * | 3/2005 | Tsatsanis et al. ......... | 379/406.01 |

FOREIGN PATENT DOCUMENTS

| | | |
|---|---|---|
| CA | 2237460 | 11/1998 |
| JP | 8-279724 | 10/1996 |
| JP | 10-303674 | 11/1998 |
| JP | 2000-201044 | 7/2000 |
| JP | 2001-333582 | 11/2001 |
| JP | 2002-204189 | 7/2002 |

(Continued)

OTHER PUBLICATIONS

Partial International Search Report dated Aug. 24, 2005.

(Continued)

*Primary Examiner* — Fan Tsang
*Assistant Examiner* — Ibraham Sharifzada
(74) *Attorney, Agent, or Firm* — Dickinson Wright PLLC

(57) ABSTRACT

A line state detecting apparatus provided in a balanced transmission system includes, in transmission lines comprising a pair of conductors W1, W2 connected to a transmitting portion 13, current transformers T11, T12 primary sides of which are inserted to respectives thereof in series therewith and secondary sides of which are connected in series to cancel currents or voltages of the two transformer by each other, and a detecting portion 11 for detecting currents or voltages on secondary sides of the current transformers T11, T12. By an output of the detecting portion 11, a difference of currents or voltages of the conductors W1, W2 of the transmission lines is provided and an unbalance component between the conductors W1, W2 is detected.

4 Claims, 25 Drawing Sheets

FOREIGN PATENT DOCUMENTS

| | | |
|---|---|---|
| JP | 2003-087973 | 3/2003 |
| JP | 2004-080436 | 3/2004 |
| JP | 2004 080441 | 3/2004 |
| JP | 2004 140565 | 5/2004 |
| JP | 2004-328614 | 11/2004 |
| JP | 2004-357421 | 12/2004 |
| WO | 9302518 | 2/1993 |
| WO | 03/005578 | 1/2003 |

OTHER PUBLICATIONS

Japanese Office Action dated Mar. 30, 2010 with English translation, which issued in corresponding Japanese Patent Application No. 2004-121455.

Japanese Office Action dated Mar. 30, 2010 with English translation, which issued in corresponding Japanese Patent Application No. 2004-121456.

* cited by examiner

LINE STATE DETECTING APPARATUS AND TRANSMITTING APPARATUS AND RECEIVING APPARATUS OF BALANCED TRANSMISSION SYSTEM

BACKGROUND OF THE INVENTION

The present invention relates to a line state detecting apparatus for detecting a state of a transmission line in a balanced transmission system for transmitting data by using a pair of conductors, and a transmitting apparatus and a receiving apparatus of a balanced transmission system provided therewith.

In a background art, there is widely used a balanced transmission system for transmitting data by using a pair of transmission lines brought into a balanced state. In a balanced transmission system of this kind, as in, for example, a telephone line, a transmission line by an exclusive communication line or the like is frequently used, normally, some degree of balance is moderately maintained by current flowing via a forward line or a rearward line of pair of transmission line.

FIG. 31 shows an example of a transmitting portion and a transmission line of a balanced transmission apparatus of a background art. The balanced transmission apparatus is constructed by a constitution of transmitting a signal to transmission lines comprising a pair of conductors W1, W2 from a transmitting portion 92 via a transmission transformer T91. In this case, a current of a transmission signal transmitted from the transmitting portion 92 depends of characteristics of the transmitting portion 92 and the transmission lines W1, W2.

Although the transmission lines reaching a receiving portion from the transmitting portion are inherently requested to be completely balanced, actually, there are unbalance elements in the transmitting portion and the receiving portion, unbalance components by a situation of wires of the transmission lines and an apparatus connected to a middle of the transmission lines and the like, and it is an actual situation that currents flowing in the conductors W1, W2 of the transmission lines are not regarded to be completely balanced. When the currents flowing in the transmission lines are unbalanced in this way, a portion of a transmission power leaks from the transmission line to outside to deteriorate a transmission characteristic of data or bring about a drawback of interference or the like.

Recently, there is proposed a balanced transmission system for transmitting data by superposing a high frequency signal on a power line for carrying a power of a commercial power source or the like. Particularly, such a power line is not inherently a line for communication and therefore, balance may be dispersed by an individual household wiring situation, an apparatus connected to a power source or the like. Therefore, when the power line is used as a transmission line, there is a concern that the balance is changed by individual environments and a transmission characteristic significantly differs.

Therefore, although it is preferable to promote of balance of transmission lines by detecting a state of the transmission lines and controlling currents or voltages in two lines in a balanced transmission system, in a background art, detection and control of such a line state have not been executed.

SUMMARY OF THE INVENTION

The invention has been carried out in view of the above-described situation and it is an object thereof to provide a line state detecting apparatus capable of detecting a balanced state of transmission lines in a balanced transmission system.

Further, it is an object of the invention to provide a transmitting apparatus and a receiving apparatus of a balanced transmission system capable of controlling a balanced state of transmission lines based on a result of detection and capable of promoting a degree of balance in a balanced transmission system.

According to the invention, a line state detecting apparatus for detecting a state of a transmission line in a balanced transmission system for transmitting a data by using a pair of conductors, comprises an unbalance component detector for directly detecting an unbalance component between the pair of conductors.

Thereby, an unbalance state of an unbalance component of currents or voltages in the transmission lines can be detected. For example, the balance can be promoted by controlling a balanced state of the transmission lines based on a result of the detection.

Moreover, according to the invention, a line state detecting apparatus for detecting a state of a transmission line in a balanced transmission system for transmitting a data by using a pair of conductors, comprises an electrical component detector for detecting currents flowing in the conductors or voltages of the conductors or both thereof for the respective conductors, and an unbalance component calculator for calculating a difference of the currents of the respective conductors or a difference of the voltages for the respective conductors or both thereof detected by the electrical component detector.

Thereby, an unbalance state of an unbalance component of the currents or the voltages of the transmission lines or the like can be detected. For example, balance can be promoted by controlling a balanced state of the transmission lines based on a result of the detection.

DETAILED DESCRIPTION OF THE PREFERRED EMBODIMENTS

According to embodiments of the invention, there are shown constitution examples of a line state detecting apparatus for detecting a state of a transmission line in a balanced transmission system for transmitting data by a balanced transmission line, and a transmitter and a receiver of a balanced transmission apparatus having the line state detecting apparatus as well as a balanced transmission system having both of the transmitter and the receiver. The line state detecting apparatus of the embodiments are applicable to a balanced transmission system of a power line communication system or the like using a power line for a transmission line. Further, as data communication, the apparatus are preferably be used for power line communication using a frequency division multiplex signal or OFDM (Orthogonal Frequency Division Multiplexing) or the like or data communication of ADSL (Asymmetric Digital Subscriber Line) or the like.

First, an explanation will be given of an outline of a transmitter and a receiver of a balanced transmission apparatus and a balanced transmission system according an embodiment of the invention.

Figure 32:
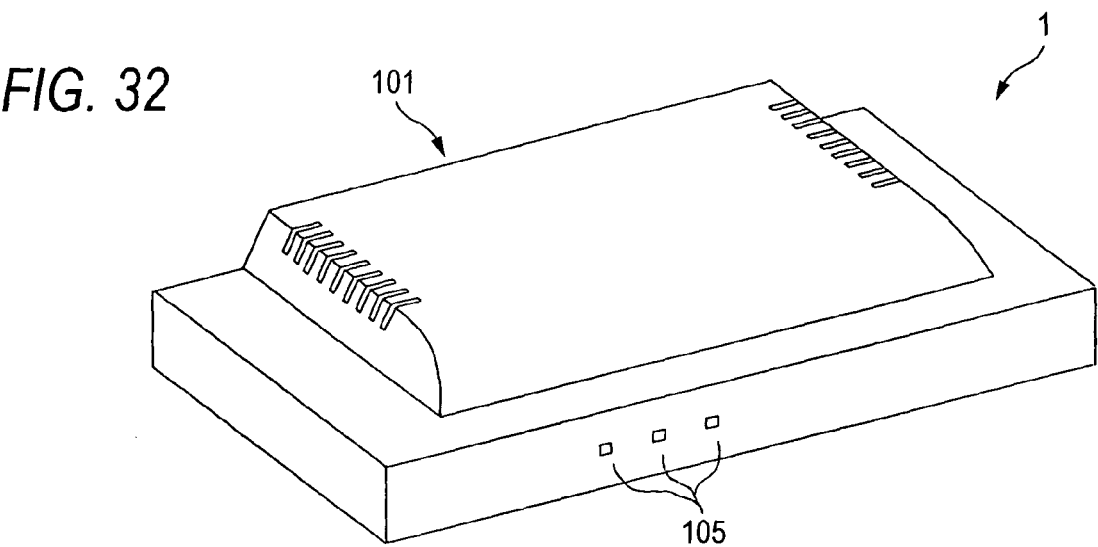
FIG. 32 is an outlook perspective view showing a front face of a transmitter.
Figure 33:
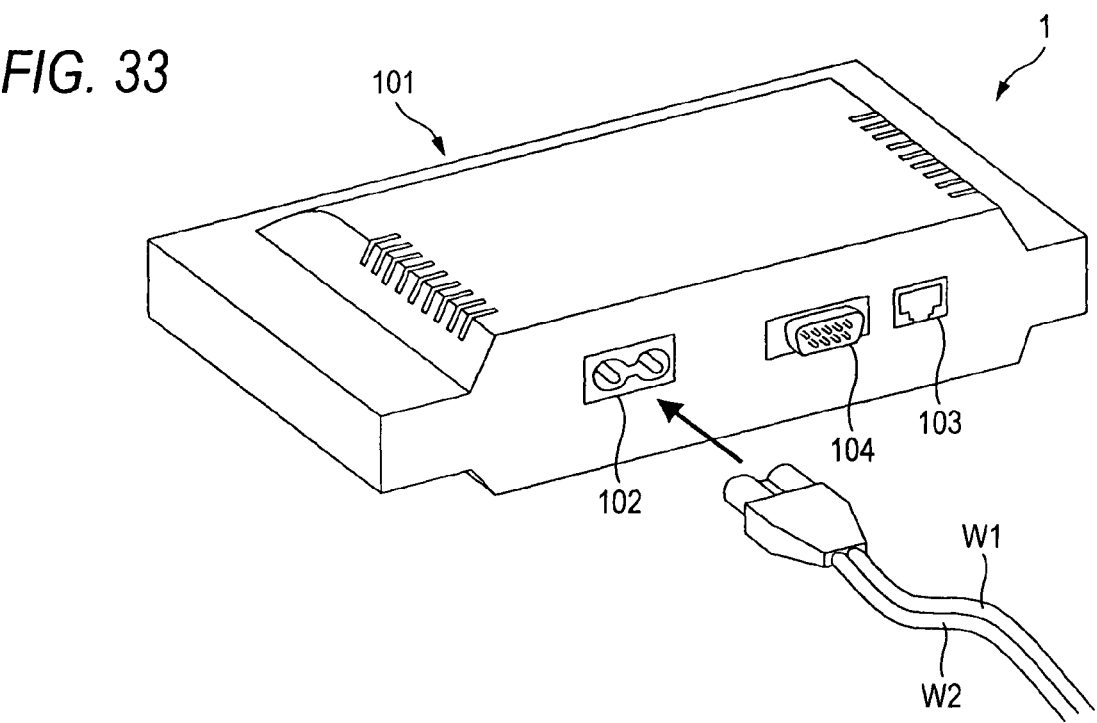
FIG. 33 is an outlook perspective view showing a rear face of the transmitter.

FIG. 32 is an outlook perspective view showing a front face of a transmitter and FIG. 33 is an outlook perspective view showing a rear face of the transmitter. A transmitter 1 according to the embodiment is a modem as shown by FIGS. 32 and 33. The transmitter 1 is provided with a cabinet 101. As shown by FIG. 32, a front face of the cabinet 101 is provided with a display portion 105 of LED (Light Emitting Diode) or the like. As shown by FIG. 33, a rear face of the cabinet 101 is provided with a power source connector 102, a modular jack 103 for LAN (Local Area Network) of RJ45, and a Dsub connector 104. As shown by FIG. 33, the power source connector 102 is connected with conductors W1, W2, of parallel cables or the like. The modular jack 103 is connected with an LAN cable, not illustrated. The Dsub connector 104 is connected with a Dsub cable, not illustrated.

Inside of the cabinet 101 is provided with a transmitting portion (mentioned later) and a coupler transformer, not illustrated. The conductors W1, W2 are applied with an alternating current voltage (for example, 100 VAC) and when the transmitting portion outputs a transmission signal, the transmission signal is superposed on the alternating current voltage via the coupler transformer. Further, although an example of the transmitter is shown in FIG. 32 and FIG. 33, this is also a constitution of a receiver. Further, although the modem of FIG. 32 and FIG. 33 is shown as an example of the transmitter, the constitution needs not to be limited thereto but the transmitter or the receiver may be an electric apparatus (for example, a household apparatus of a television set or the like) having a modem.

Figure 1:
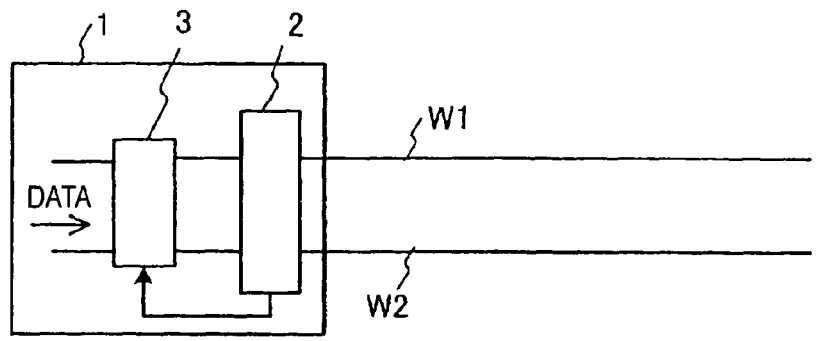
FIG. 1 is a view showing an outline constitution of a transmitter of a balanced transmission apparatus according to an embodiment of the invention.

FIG. 1 is a view showing an outline constitution of a transmitter of a balanced transmission apparatus according to an embodiment of the invention. The transmitter 1 is constituted by including a line state detecting apparatus 2 for detecting a state of a balanced transmission line comprising a pair of conductors W1, W2 constituting signal transmission lines and a transmitting portion 3 for inputting signal data for transmission and transmitting a transmission signal.

The transmission signal outputted from the transmitting portion 3 is transmitted to the conductors W1, W2 via the line state detecting apparatus 2. There is a possibility that a value of the signal injected to the conductors W1, W2 becomes a value different from a value outputted from the transmitting portion 3 by a transmission impedance of the transmitter and a transmission line impedance. The line state detecting apparatus 2 detects a level of a current or a voltage flowing in the conductors W1, W2, or levels of both thereof and calculates a state detecting signal indicating an unbalance state of the transmission line to feed back to the transmitting portion 3. The transmitting portion 3 is provided with a function of a transmission signal controller and controls a level of the outputted transmission signal, that is, the level of the current or the voltage or the levels of the both to promote a degree of balance of the signal actually transmitted to the conductors W1, W2 based on the fed-back state detecting signal.

By detecting the balanced state of the transmission line and controlling the current or the voltage or the both of the signal transmitted to the transmission line in this way, in accordance with a state of the transmission line, the level of the transmission signal actually transmitted to the conductors W1, W2 can be controlled, a common mode signal level in the transmission line can be reduced and a degree of balance in view from the transmitter can be promoted.

Figure 2:
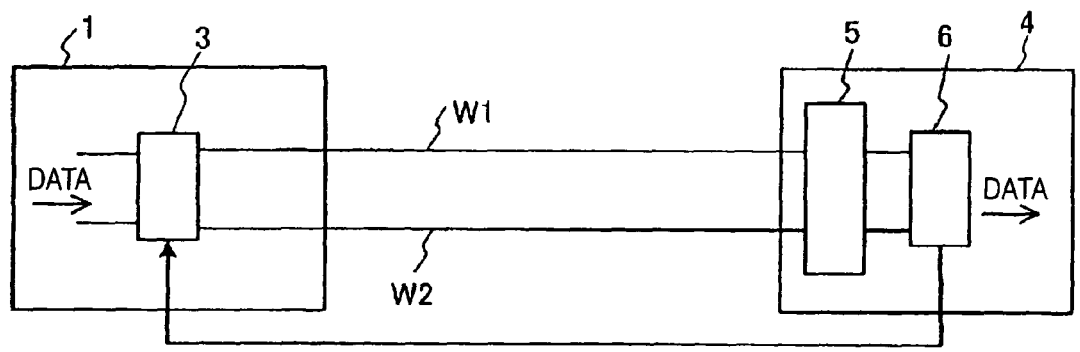
FIG. 2 is a view showing an outline constitution of a receiver of a balanced transmission apparatus according to an embodiment of the invention.

FIG. 2 is a view showing an outline constitution of a receiver of the balanced transmission apparatus according to the embodiment of the invention. The receiver 4 is constituted by including a line state detecting apparatus 5 for detecting a state of the balanced transmission line comprising the pair of conductors W1, W2 constituting the signal transmission lines, and a receiving portion 6 for receiving the transmission signal from the conductors W1, W2 and outputting signal data. Further, the transmitter 1 is constructed by a constitution of including the transmitting portion 3 connected to the conductors W1, W2 of the balanced transmission line.

The transmission signal transmitted via the conductors W1, W2 is inputed to the line state detecting apparatus 5. The line state detecting apparatus 5 detects a level of a current or a voltage flowing from the conductors W1, W2 or levels of both thereof and calculates a state detecting signal indicating an unbalance state of the transmission line to feed back to the transmitting portion 3 via the receiving portion 6. In this case, an unbalance component becomes a value as if the same signals (common mode signals) were added for respectives of the conductors W1, W2 as a bias and therefore, the bias value or the like is detected. The transmitting portion 3 is provided with the function of a transmission signal controller and controls a level of the outputted transmission signal such that, for example, the bias value of a fed-back common mode component is reduced based on the state detecting signal fed back from the receiving portion 6.

By detecting the balanced state of the transmission lines and controlling the current or the voltage or the both of the signal flowing to the transmission line or the signal flowing from the transmission line, in accordance with a state of the transmission line, a level of a receiving signal actually transmitted from the conductors W1, W2 can be controlled, a level of the common mode signal in the transmission lines can be reduced and a degree of balance in view from the receiver can be promoted.

Figure 3:
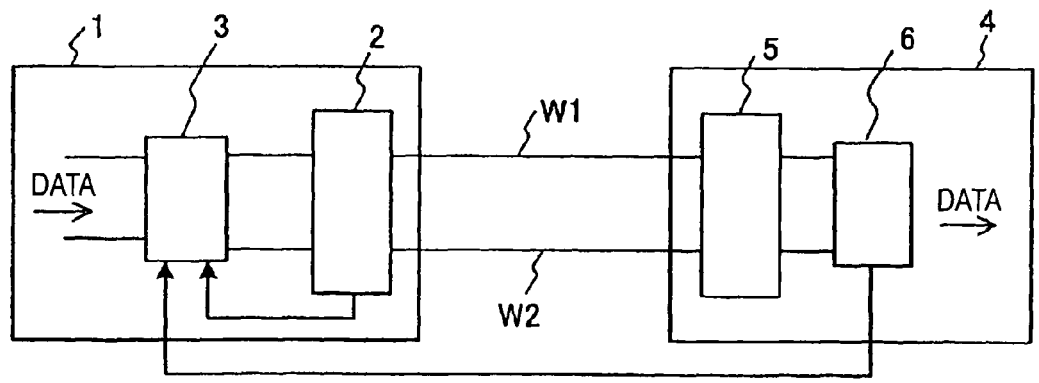
FIG. 3 is a view showing an outline constitution of a balanced transmission system having a transmitter and a receiver according to an embodiment of the invention.

FIG. 3 is a view showing an outline constitution of a balanced transmission system having the transmitter and the receiver according to the embodiment of the invention. The balanced transmission system is constructed by a constitution of including the transmitter 1 having the line state detecting apparatus 2 and the transmitting portion 3 and the receiver 4 having the line state detecting apparatus 5 and the receiving portion 6 and transmitting balanced data via the pair of conductors W1, W2 constituting the signal transmission lines.

Signal data for transmission is inputted to the transmitting portion 3 and outputted as the transmission signal and is transmitted to the conductors W1, W2 via the line state detecting apparatus 2. In this case, the level of the signal transmitted to the conductors W1, W2 is detected by the line state detecting apparatus 2 and the state detecting signal indicating the unbalance state of the transmission lines is calculated to feed back to the transmitting portion 3. At the transmitting portion 3, the level of the outputted transmission signal is controlled based on the state detecting signal and the degree of balance of the signal outputted to the conductors W1, W2 is controlled to promote.

Further, the transmission signal transmitted via the conductors W 1, W2 is received by the receiving portion 6 via the line state detecting apparatus 5 and the signal data is acquired to output. In this case, the level of the signal transmitted at the conductors W1, W2 is detected by the line state detecting apparatus 5 and the state detecting signal indicating the unbalance state of the transmission lines is calculated to feed back to the transmitting portion 3 via the receiving portion 6. At the transmitting portion 3, the level of the transmission signal outputted based on the state detecting signal is controlled, thereby, the degree of balance of the signal received by the receiving portion 6 via the conductors W1, W2 is controlled to promote.

By detecting the balance state of the transmission lines by the transmitting portion and the receiving portion and controlling the current or the voltage or the both of the signal at the transmission lines, in accordance with the state of the transmission lines, the level of the transmission signal at the conductors W1, W2 can be controlled, the common mode signal level at the transmission line can be reduced and the degree of balance in view from at least one of the transmitter and the receiver can be promoted.

Next, a number of embodiments of the line state detecting apparatus of the invention used in the transmitter and the receiver of the balanced transmission apparatus as well as the balanced transmission system as described above will be shown. The line state detecting apparatus according to embodiments detect a state with regard to a degree of balance of the transmission lines by directly detecting an unbalance component of voltages or currents of the pair of conductors constituting the transmission lines, or both thereof. Further, although in the following embodiments, the line state detecting apparatus applied to the transmitter are exemplified, the embodiments are similarly applicable to the receiver.

First Embodiment

Figure 4:
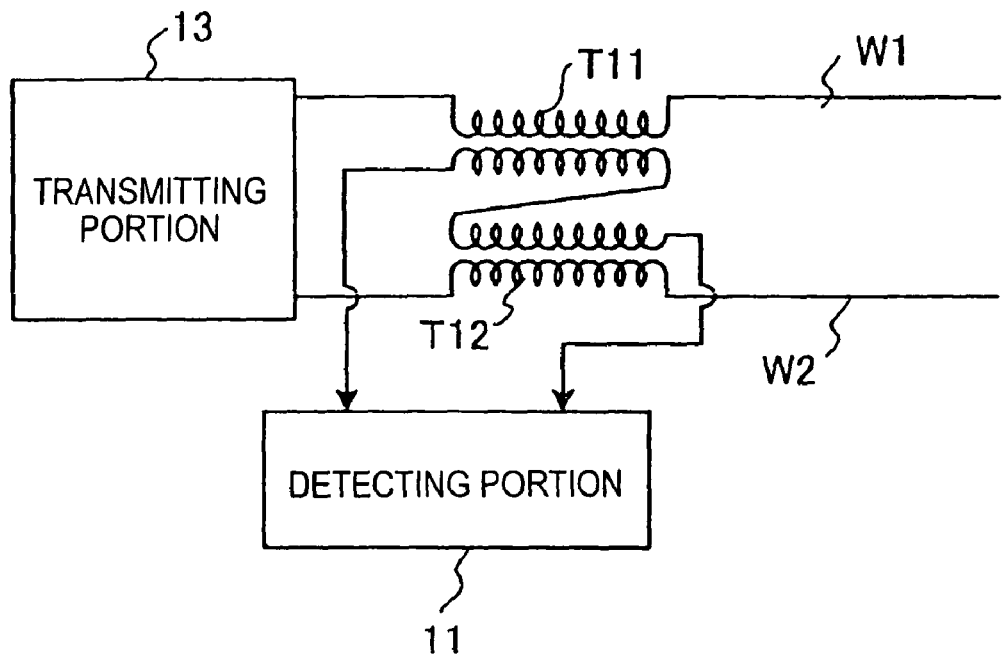
FIG. 4 is a view showing a basic constitution of a line state detecting apparatus according to a first embodiment of the invention.

FIG. 4 is a view showing a basic constitution of a line state detecting apparatus according to a first embodiment of the invention. The line state detecting apparatus of the embodiment includes current transformers T11, T112 primary sides (primary windings) of which are respectively inserted to transmission lines of a forward line side and a rearward line side comprising a pair of conductors W1, W2 connected to the transmitting portion 13 in series therewith. Secondary sides (secondary windings) of the current transformers T21, T22 are connected in series to respectively cancel currents or voltages in the two transformers. Further, the line state detecting apparatus is constructed by a constitution of including the detecting portion 11 for detecting currents or voltages on secondary sides of the current transformers T11, T12.

In the constitution, the detecting portion 11 can directly detect a common mode current (unbalance current) constituting a difference of the currents of the forward line and the rearward line of the conductors W1, W2 of the transmission lines in a state of being isolated from the transmission lines. Therefore, an unbalance component of a transmission power from the transmitting portion 13 can be detected by a simple constitution.

Figure 5:
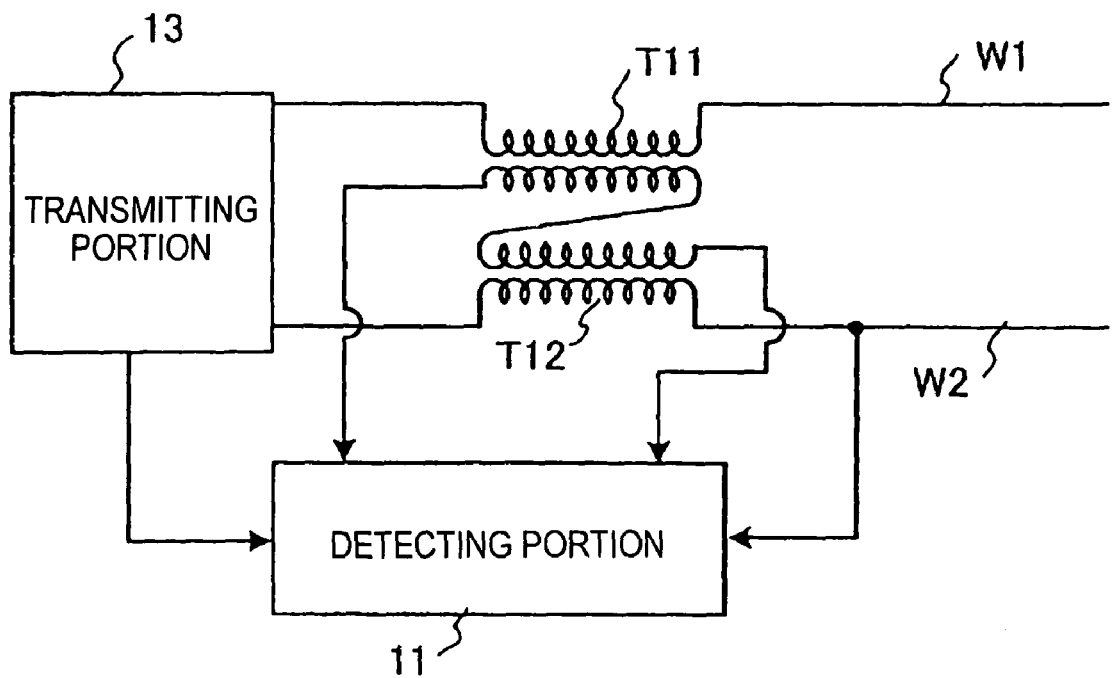
FIG. 5 is a view showing a first modified example of the line state detecting apparatus according to the first embodiment.

FIG. 5 shows a first modified example of the line state detecting apparatus according to the first embodiment. The first modified example is constructed by a constitution of connecting either one of the conductors W1 and W2 (W2 in the example of the drawing) of the transmission lines and the transmitting portion 13 to the detecting portion 11. In the constitution, the detecting portion 11 detects the currents or the voltages on the secondary sides of the current transformers T11, T12, inputs a portion of the transmission signal transmitted from the transmitting portion 13 or a carried signal carried by the conductor W1 or W2 and compares phases of the transmission signal or the signal carried by the conductor W1 or W2 and the current or the voltage of an unbalance component of the conductors W1, W2 or both thereof. Thereby, a direction of a common mode current can be detected along with amplitude of the unbalance component between the conductors W1, W2. Further, in comparing the phases by the detecting portion 11, in place of the transmission signal, the phase(s) of the current(s) or the voltage(s) of one or both of the conductors W1, W2 may be used.

Further, the line state detecting apparatus of FIG. 5 may be constructed by a constitution of calculating a product of the current or the voltage of the unbalance component of the conductors W1, W2 detected by the detecting portion 11 by the current or the voltage of the transmission signal outputted from the transmitting portion 13 or the conductor W1 or W2 by the detecting portion 11. Thereby, not only an amount of the unbalance component between the conductors W1, W2 of the transmission lines can be detected by a calculated value of the product but also the direction of the common mode current can be detected by a sign of the calculated value.

Figure 6:
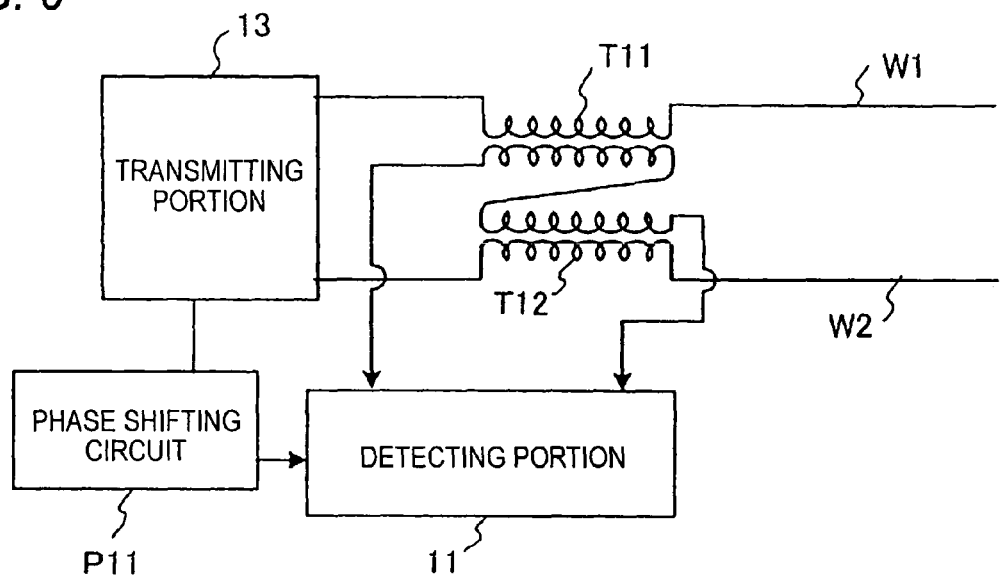
FIG. 6 is a view showing a second modified example of the line state detecting apparatus according to the first embodiment.

FIG. 6 shows a second modified example of the line state detecting apparatus according to the first embodiment. The second modified example is constructed by a constitution of including a phase shifting circuit P11 for inputting a portion of the transmission signal transmitted from the transmitting portion 13 and shifting a phase of the current or the voltage of the transmission signal to output to the detecting portion 11 in the constitution of FIG. 4. The phase shifting circuit P11 may be either of a circuit for shifting the phase in analog by a delay element or a circuit of executing a phase shifting processing in digital by a digital circuit. In the constitution, the phase shifting circuit P11 compensates for the phase by advancing or retarding the phase of the transmission signal outputted from the transmitting portion 13. The detecting portion 11 detects the currents or the voltages on the secondary sides of the current transformers T11, T12, inputs the transmission signal the phase of which is compensated for by the phase shifting circuit P11 and calculates a product of the current or the voltage of the unbalance component of the conductors W1, W2 by the current or the voltage of the transmission signal. Thereby, a value of the unbalance component between the conductors W1, W2 of the transmission lines and a direction of the common mode current can accurately be detected.

Figure 7:
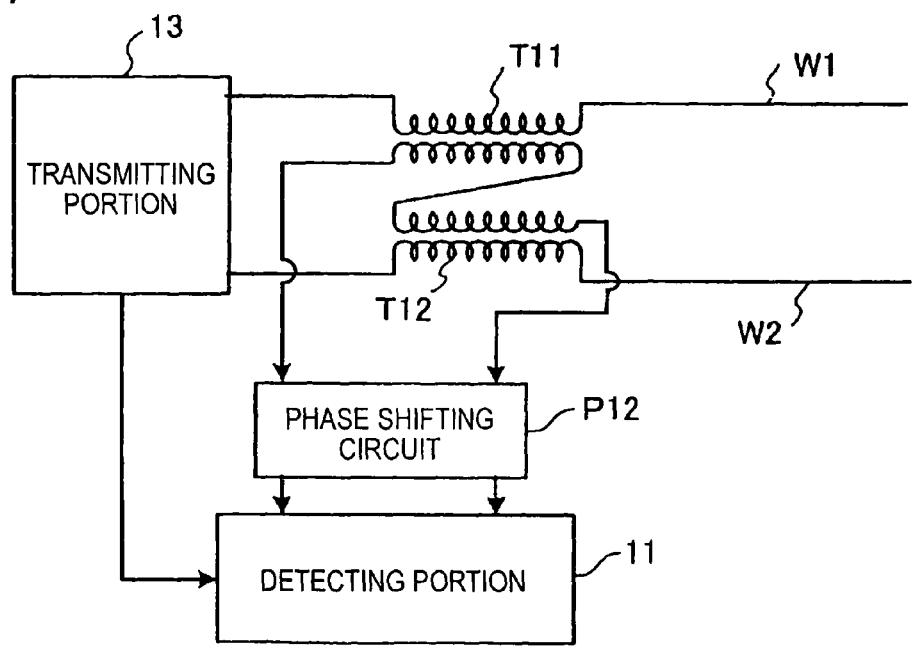
FIG. 7 is a view showing a third modified example of the line state detecting apparatus according to the first embodiment.

FIG. 7 shows a third modified example of the line state detecting apparatus according to the first embodiment. The third modified example is constructed by a constitution of including a phase shifting circuit P12 for shifting the phase of the voltage or the current of the unbalance component of the conductor W1 or W2 of the transmission lines to output to the detecting portion 11 in the constitution of FIG. 4. The phase shifting circuit P12 may be either of a circuit of shifting the phase in analog by a delay element or the like and a circuit of executing a phase shifting processing in digital by a digital circuit. In the constitution, the phase shifting circuit P12 compensates for the phase by advancing or retarding the phase of the voltage or the current of the detected unbalance component of the conductors W1, W2. The detecting portion 11 detects the currents or the voltages on the secondary sides of the current transformers T11, T12 and inputs the current or the voltage of the unbalance component in the conductor W1 or W2 the phase of which is compensated for by the phase shifting circuit P12 and a portion of the transmission signal transmitted from the transmitting portion 13 to calculate a product thereof. Thereby, the value of the unbalance component between the conductors W1, W2 of the transmission lines and the direction of the common mode current can accurately be detected.

According to the line state detecting apparatus of the first embodiment, by detecting the currents or the voltages on the secondary sides of the current transformers T11, T12 the primary sides of which are inserted to respectives of the conductors W1, W2 constituting the transmission lines in series therewith and the secondary sides of which are connected in series to cancel the currents or the voltages of the two transformers by the detecting portion 11, the difference of the currents of the forward line and the rearward line between the conductors W1, W2, that is, the unbalance component can directly be detected in the state of being separated from the transmission lines.

Further, in the detecting portion 11, by comparing the phases of the current of the unbalance component detected by the above-described constitution and the current or the voltage of the portion of the transmission signal outputted from the transmitting portion 13, and calculating the product of the both, the direction of the common mode current can be detected along with the value of the unbalance competent between the conductors W1, W2 of the transmission lines. Further, by compensating for the phase of the transmission signal outputted from the transmitting portion 13 or the phase of the voltage or the current of the unbalance component of the conductors W1, W2 by the phase shifting circuit and calculating the product of the current or the voltage of the unbalance component of the conductors W1, W2 by the transmission signal, the direction and an absolute value of the unbalance component in the transmission lines can accurately be detected.

Second Embodiment

Figure 8:
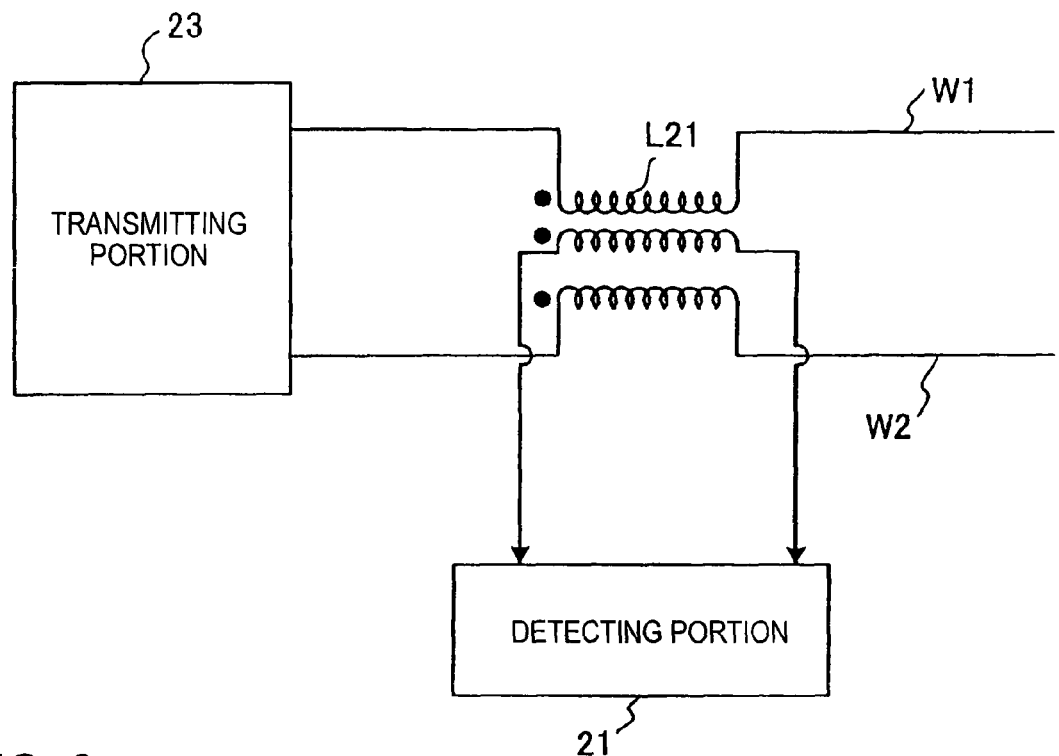
FIG. 8 is a view showing a basic constitution of a line state detecting apparatus according to a second embodiment of the invention.

FIG. 8 is a view showing a basic constitution of a line state detecting apparatus according to a second embodiment of the invention. According to the line state detecting apparatus of the embodiment, in the transmission lines of the forward line side and the rearward line side comprising the pair of conductors W1, W2 connected to the transmitting portion 23, a first and a second winding are inserted respectively to the conductors W1, W2 in series therewith and a common mode coil L21 having a third winding for detecting a common mode is provided. Further, the line state detecting apparatus is constructed by a constitution of including a detecting portion 21 for detecting a common mode current or an unbalance voltage between the conductors W1, W2 induced at the third winding by detecting a voltage or a current across both ends of the third winding of the common mode coil L21.

In the constitution, the detecting portion 21 can directly detect a common mode current (unbalance current) of the conductors W1, W2 of the transmission lines in a state of being separated from the transmission lines. Therefore, an unbalance component of a power transmitted from the transmitting portion 23 can be detected by a simple constitution. Further, according to the constitution of the second embodiment, in comparison with a constitution of using the current transformers of the first embodiment, the constitution is simplified, a detection error by a difference of detection accuracies produced by a dispersion in characteristics between the two current transformers is reduced and a detection sensitivity and the detection accuracy are improved.

Further, by making the common mode coil L21 serve also as a common mode coil for a countermeasure against undesirable radiation which is normally provided in a communication apparatus or the like, a number of parts can be reduced and cost can be reduced. By constituting the common mode coil L21 by a troidal core, the detection accuracy can be promoted. Further, according to a position of arranging the common mode coil L21, by arranging the common mode coil L21 at a vicinity of an input/output portion of the transmission line of the transmitter or the receiver to be as proximate to the transmission line as possible, the detection accuracy can further be promoted.

Figure 46:
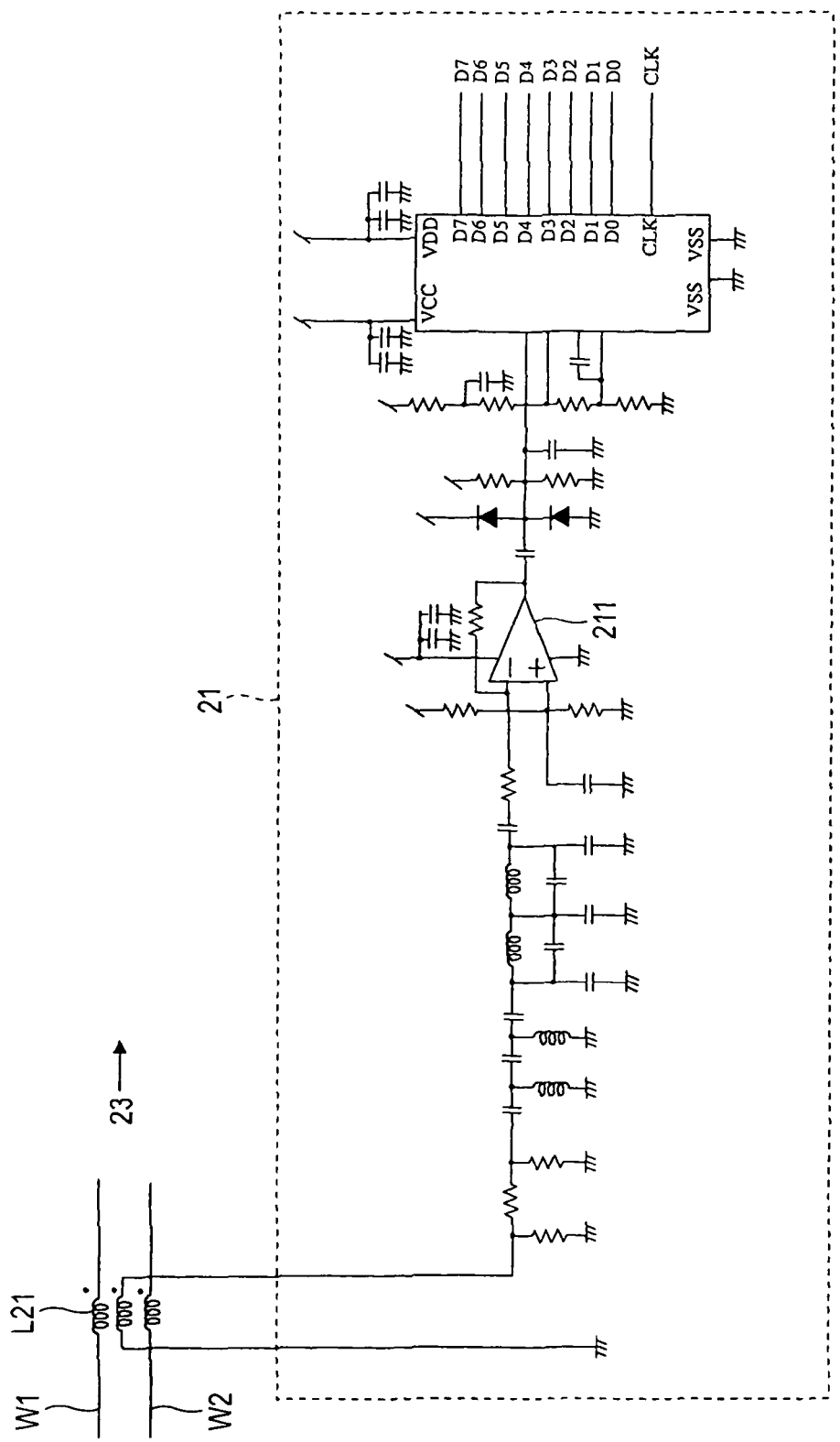
FIG. 46 shows an example of a detailed circuit diagram of the detecting portion.

An explanation will be given here of a detailed circuit constitution of the detecting portion. FIG. 46 shows an example of a detailed circuit diagram of the detecting portion. As shown by FIG. 46, the detecting portion 21 includes an amplifier 211 and an input side of the amplifier 211 is connected to the common mode coil L21 via various kinds of capacitors and inductors.

Figure 9:
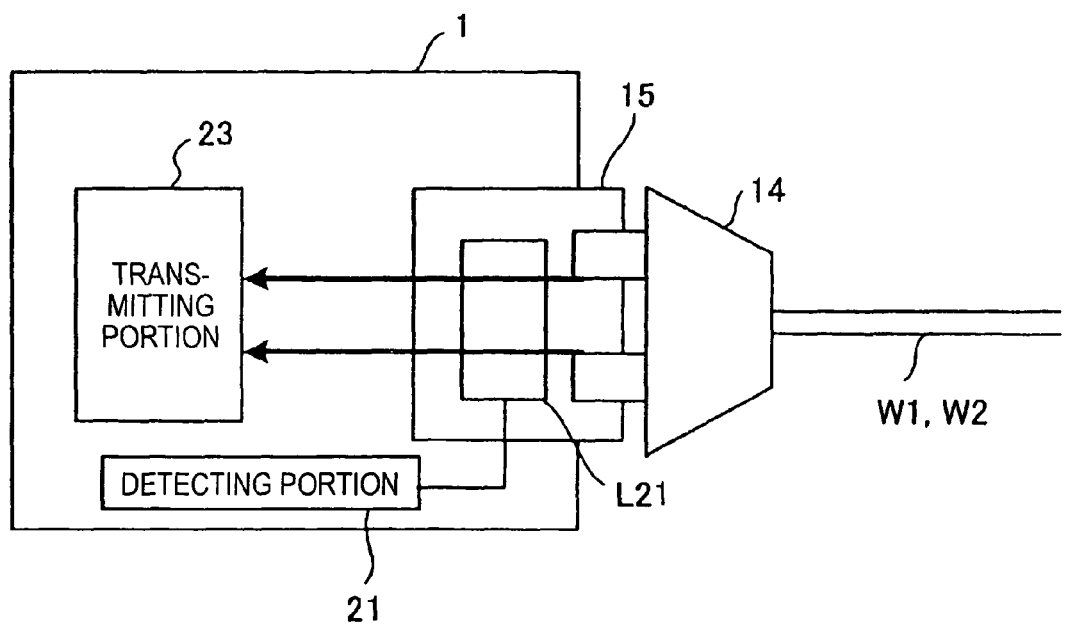
FIG. 9 is a view showing a constitution example providing a common mode coil according to the second embodiment to an inlet connector for connecting a power source cord to an apparatus in a power line communication system using a power line for a transmission line.

FIG. 9 is a view showing a constitution example for providing a common mode coil at an inlet connector for connecting a power source cord of an apparatus in a power line communication system using a power line in a transmission line. The transmitter 1 is provided with an inlet connector 15 attachably and detachably connected with a plug 14 of a power source code including the conductors W1, W2 and the conductors W1, W2 and the transmitting portion 23 are connected via the inlet connector 15. The inlet connector 15 includes the common mode coil L21 and a common mode current or an unbalance voltage between the conductors W1, W2 can be detected by the detecting portion 21 based on an output of the common mode coil L21. Further, the common mode coil may be provided to the plug of the power source code or the like other than the inlet connector.

Figure 10:
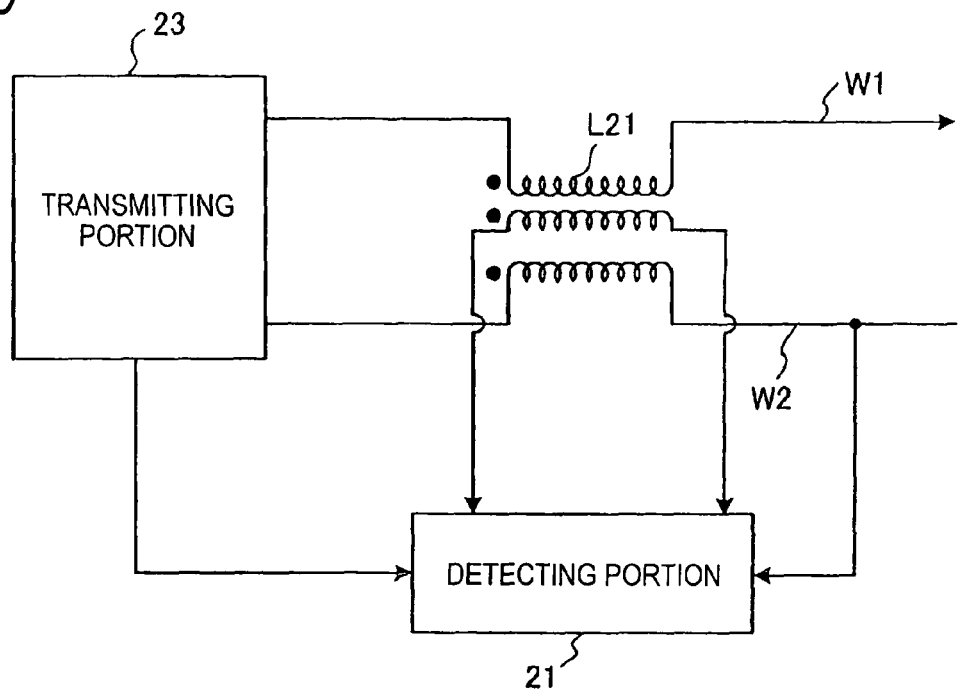
FIG. 10 is a view showing a first modified example of the line state detecting apparatus according to the second embodiment.

FIG. 10 shows a first modified example of the line state detecting apparatus according to the second embodiment. The first modified example is constructed by a constitution of connecting either of the conductors W1 and W2 of the transmission lines (W2 in the example of the drawing) or the transmitting portion 23 and the detecting portion 21 in the constitution of FIG. 8. In the constitution, the detecting portion 21 detects a voltage or a current across both ends of the third winding of the common mode coil L21, inputs a portion of a transmission signal transmitted from the transmitting portion 23 or a carried signal transmitted by the conductors W1 or W2 and compares phases of the transmission signal and a current or a voltage of the unbalance component of the conductors W1, W2 detected by the third winding of the common mode coil L21 or both thereof. Thereby, a direction of the common mode current can be detected along with amplitude of the unbalance component between the conductors W1, W2. Further, in comparing the phases by the detecting portion 21, phase(s) of the current(s) or the voltage(s) of one or both of the conductors W1, W2 may be used.

Further, the line state detecting apparatus of FIG. 10 may be constructed by a constitution of calculating a product of the current or the voltage of the unbalance component of the conductors W1, W2 detected by the third winding of the common mode coil L21 by the current or the voltage of the transmission signal outputted from the transmitting portion 23 by the detecting portion 21. Thereby, not only an amount of the unbalance component between the conductors W1, W2 of the transmission lines can be detected by a calculated value of the product but also a direction of the common mode current can be detected by a sign of the calculated value.

Figure 11:
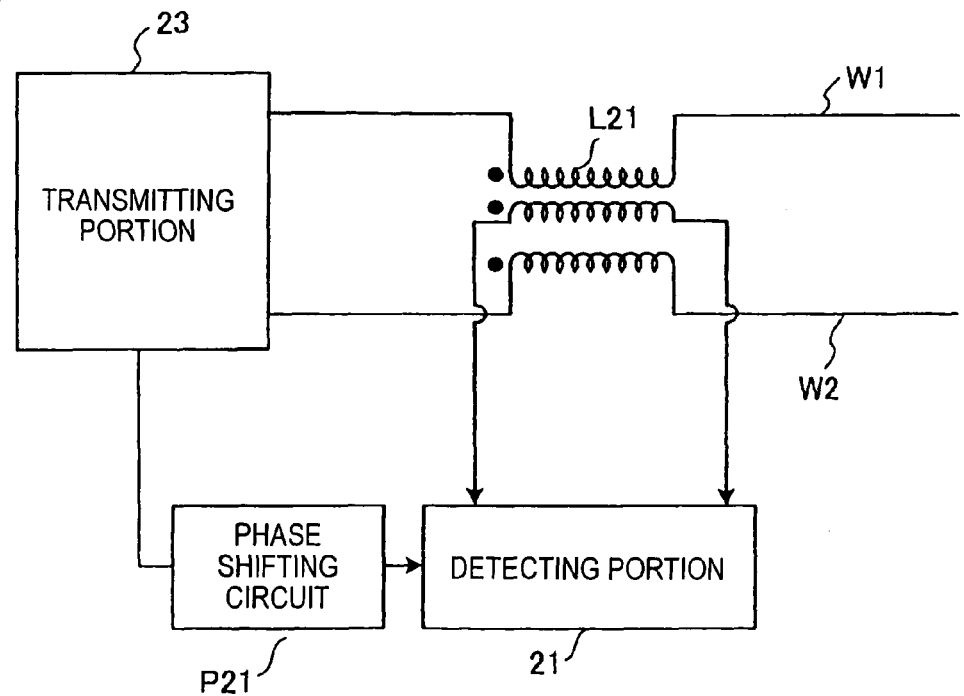
FIG. 11 is a view showing a second modified example of the line state detecting apparatus according to the second embodiment.

FIG. 11 shows a second modified example of the line state detecting apparatus according to the second embodiment. The second modified example is constructed by a constitution of including a phase shifting circuit P21 for inputting a portion of the transmission signal transmitted from the transmitting portion 23 and shifting a phase of the current or the voltage of the transmission signal to output to the detecting portion 21 in the constitution of FIG. 8. The phase shifting circuit P22 may be either of a circuit of shifting the phase in analog by a delay element or the like and a circuit of executing a phase shifting processing in digital by a digital circuit. In the constitution, the phase shifting circuit P22 compensates for the phase by advancing or retarding the phase of the transmission signal outputted from the transmitting portion 23. The detecting portion 21 detects the voltage or the current across the both ends of the third winding of the common mode coil L21 and calculates a product of the current or the voltage of the unbalance component of the conductors W1, W2 by the current or the voltage of the transmission signal. Thereby, the value of the unbalance component between the conductors W1, W2 of the transmission lines and the direction of the common mode current can accurately be detected.

Figure 12:
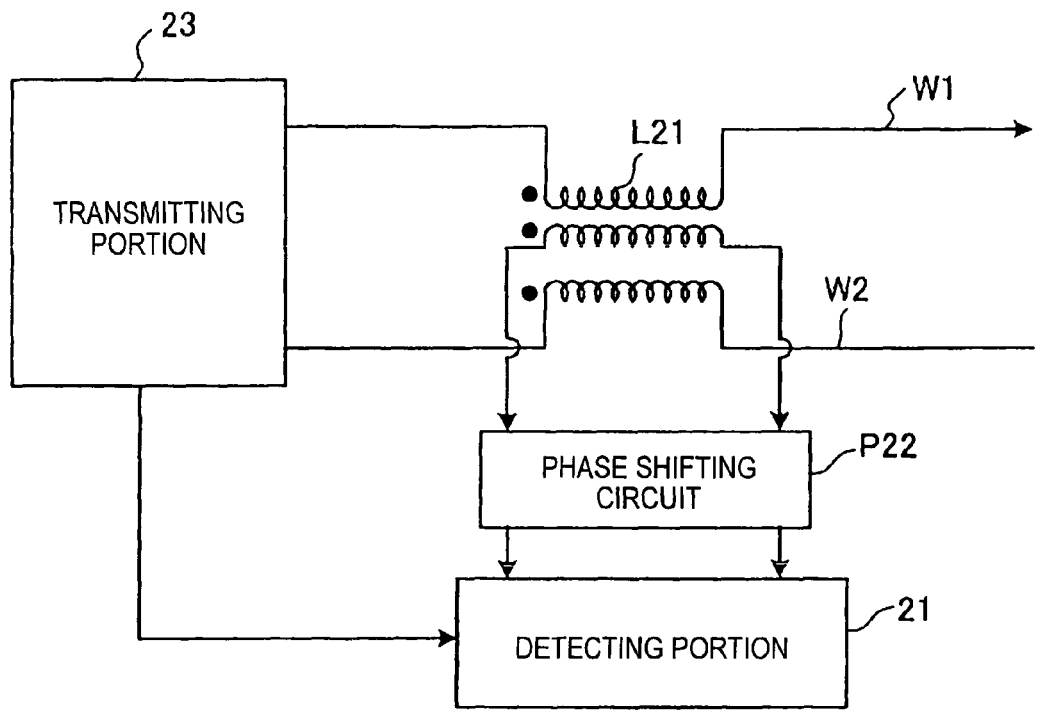
FIG. 12 is a view showing a third modified example of the line state detecting apparatus according to the second embodiment.

FIG. 12 shows a third modified example of the line state detecting apparatus according to the second embodiment. The third modified example is constructed by a constitution of including a phase shifting circuit P22 for shifting the phase of the voltage or the current of the unbalance component detected by the common mode coil L21 to output to the detecting portion 21 in the constitution of FIG. 8. The phase shifting circuit P22 may be either of a circuit of shifting the phase in analog by a delay element or the like and a circuit of executing a phase shifting processing in digital by a digital circuit. In the constitution, the phase shifting circuit P22 compensate for the phase by advancing or retarding the phase of the current or the voltage of the unbalance component detected by the common mode coil L21. The detecting portion 21 detects the voltage or the current across the both ends of the third winding of the common mode coil L21, inputs the current of the inverse component of the conductor W1 or W2 the phase of which is compensated for by the phase shifting circuit P22 and a portion of the transmission signal transmitted from the transmitting portion 23 and calculates a product thereof. Thereby, the value of the unbalance component between the conductors W1, W2 of the transmission lines and the direction of the common mode current can accurately be detected.

According to the line state detecting apparatus of the second embodiment, the difference of the current or the voltage between the conductors W1, W2, that is, the unbalance component can directly be detected in the state of being separated from the transmission lines by inserting the first and the second windings to respectives of the conductors W1, W2 constituting the transmission lines and detecting the voltage or the current across the both ends of the third winding of the common mode coil L21 having the third winding for detecting the common mode by the detecting portion 21.

Further, in the detecting portion 21, by comparing the phases of the current or the voltage of the unbalanced component detected by the above-described constitution and the current or the voltage of the portion of the transmission signal outputted from the transmitting portion 23 and calculating the product of the both, the direction of the common mode current can be detected along with the value of the unbalance component between the conductors W1, W2 of the transmission lines. Further, by compensating for the phase of the current or the voltage of the transmission signal outputted from the transmitting portion 23 or the current or the voltage at either one of the conductors W1, W2 by the phase shifting circuit and calculating the product of the current or the voltage of the unbalance component detected by the common mode coil L21 in the conductors W1, W2 by the transmission signal, the direction and the absolute value of the unbalance component of the transmission lines can accurately be detected.

Third Embodiment

Figure 13:
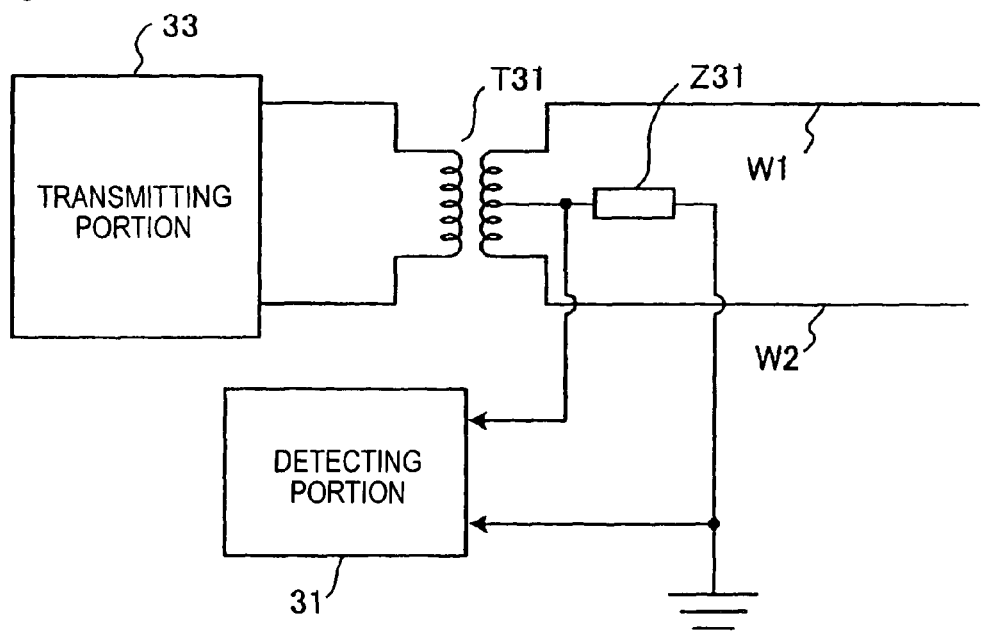
FIG. 13 is a view showing a basic constitution of a line state detecting apparatus according to a third embodiment of the invention.

FIG. 13 is a view showing a basic constitution of a line state detecting apparatus according to a third embodiment of the invention. The line state detecting apparatus of the embodiment is constituted by including, in transmission lines comprising the pair of conductors W1, W2 connected to a transmitting portion 33, a transformer T31 for transmission having a middle point tap on a secondary side of a side of the transmission lines inserted between the transmission lines and the transmitting portion 33, an impedance Z31 inserted between the middle point tap on the secondary side of the transmission transformer T31, and a detecting portion 31 for detecting a voltage across both ends of the impedance Z31.

In the constitution, the detecting portion 31 can directly detect a common mode voltage (unbalance voltage) of the conductors W1, W2 of the transmission lines by a voltage between the middle point on the secondary side of the transmission transformer T31 and a ground potential. Therefore, an unbalance component of a power transmitted from the transmitting portion 33 can be detected by a simple constitution. Further, according to the constitution of the third embodiment, the constitution is further simplified by using the transmission transformer having the middle point tap.

Figure 14:
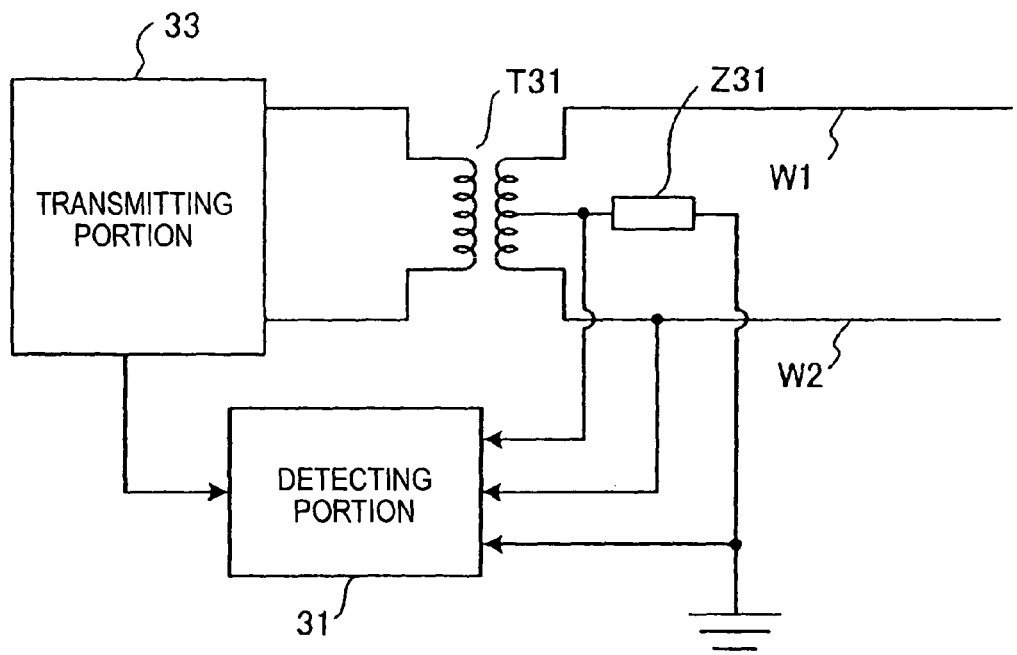
FIG. 14 is a view showing a first modified example of the line state detecting apparatus according to the third embodiment.

FIG. 14 shows a first modified example of the line state detecting apparatus according to the third embodiment. The first modified example is constructed by a constitution of connecting one of the conductors W1 and W2 (W2 in the example of the drawing) or the transmitting portion 33 to the detecting portion 31 in the constitution of FIG. 13. In the constitution, the detecting portion 31 detects the voltage across the both ends of the impedance Z31, inputs a portion of a transmission signal transmitted from the transmitting portion 33 or a carried signal carried by the conductor W1 or W2 and compares phases of the signal and a voltage of an unbalance component of the conductors W1, W2. Thereby, a direction of the unbalance voltage can be detected along with amplitude of the unbalance component between the conductors W1, W2. Further, in comparing the phases by the detecting portion 31, phase(s) of voltage(s) of one or both of the conductors W1, W2 may be used.

Further, the line state detecting apparatus of FIG. 14 may be constructed by a constitution of calculating a product of the voltage of the unbalance component of the conductors W1, W2 detected at the middle point of the transmission transformer T31 by the voltage of the transmission signal transmitted from the transmitting portion 23 by the detecting portion 31. Thereby, not only an amount of the unbalance component between the conductors W1, W2 of the transmission lines can be detected by a calculated value of the product but also a direction of a common mode current can be detected by a sign of the calculated value.

Figure 15:
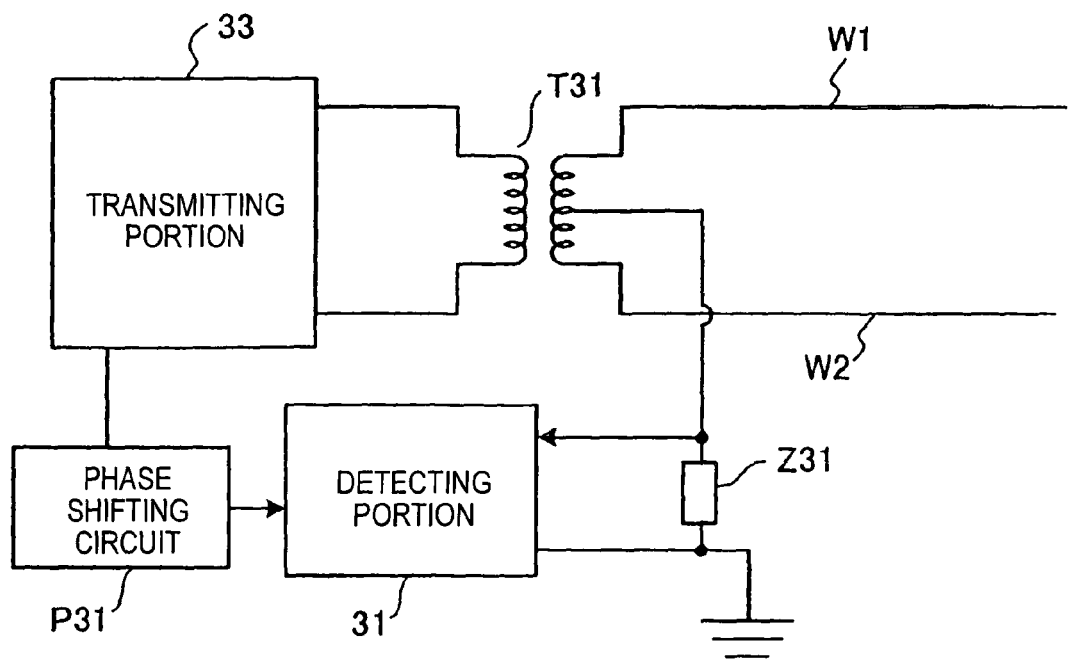
FIG. 15 is a view showing a second modified example of the line state detecting apparatus according to the third embodiment.

FIG. 15 shows a second modified example of the line state detecting apparatus according to the third embodiment. The second modified example is constructed by a constitution of including the detecting portion 31 for detecting the voltage between the middle point on the secondary side of the transmission transformer T31 and the ground potential, and a phase shifting circuit P31 for inputting a portion of the transmission signal transmitted from the transmitting portion 33 and shifting the phase of voltage the transmission signal to output to the detecting portion 31. The phase shifting circuit P31 may be either of a circuit for shifting the phase in analog by a delay element or the like and a circuit for executing a phase shifting processing in digital by digital circuit. In the constitution, the phase shifting circuit P31 compensates for the phase by advancing or retarding the phase of the transmission signal transmitted from the transmitting portion 33. The detecting portion 31 detects the voltage between the middle point on the secondary side of the transmission transformer T31 and the ground potential, inputs the transmission signal the phase of which is compensated for by the phase shifting circuit P31 and calculates the product of the voltage of the unbalance component of the conductors W1, W2 by the voltage of the transmission signal. Thereby, a value of the unbalance component between the conductors W1, W2 of the transmission lines and a direction of the common mode current can accurately be detected.

Figure 16:
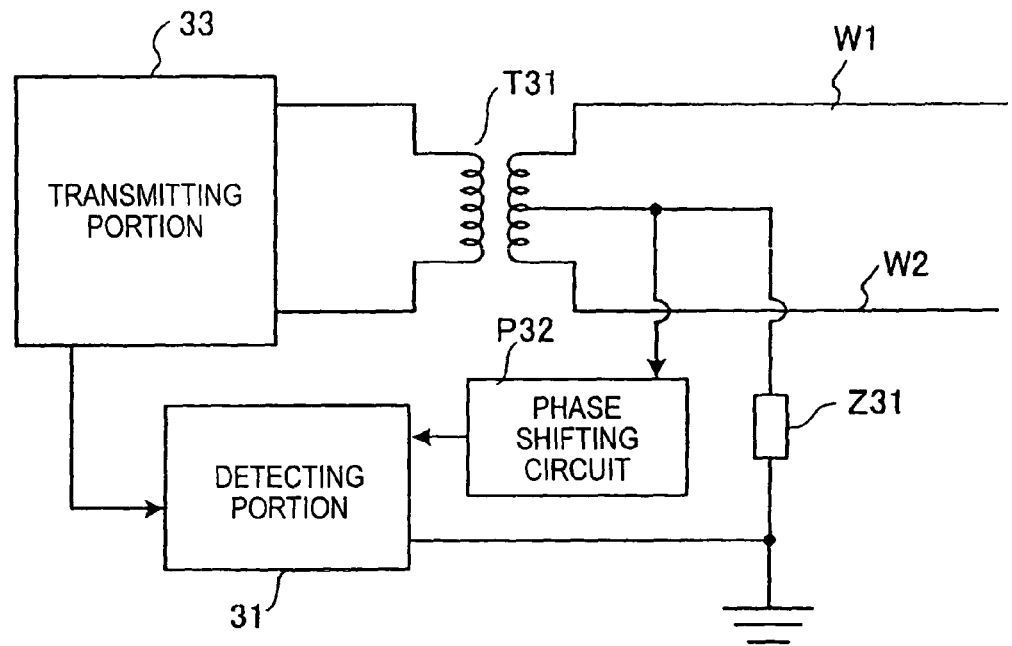
FIG. 16 is a view showing a third modified example of the line state detecting apparatus according to the third embodiment.

FIG. 16 shows a third modified example of the line state detecting apparatus according to the third embodiment. The third modified example is constructed by a constitution of including a phase shifting circuit P32 for shifting the phase of the unbalance voltage of the transmission lines outputted from the middle point tap on the secondary side of the transmission transformer T31 to output to the detecting portion 31. The phase shifting circuit P32 may be either of a circuit for shifting the phase in analog by a delay element or the like and a circuit for executing a phase shifting processing in digital by a digital circuit. In the constitution, the phase shifting circuit P32 compensates for the phase by advancing or delaying the phase of the voltage at the middle point on the secondary side of the transmission transformer T31. The detecting portion 31 inputs the voltage between the middle point on the secondary side of the transmission transformer T31 the phase of which is compensated for by the phase shifting circuit P32 and the ground and a portion of the transmission signal transmitted from the transmitting portion 33 and calculates a product thereof. Thereby, a value of the unbalance component between the conductors W1, W2 of the transmission lines and a direction of the common mode current can accurately be detected.

According to the line state detecting apparatus of the third embodiment, by detecting the potential of the middle point on the secondary side by the detecting portion 31 by using the transmission transformer T31 having the middle point tap on the secondary side on the side of the transmission lines inserted between the transmission lines comprising the conductors W1, W2 and the transmitting portion 33, a difference of the current or the voltage between the conductors W1, W2, that is, the unbalance component can directly be detected by a simple constitution.

Further, in the detecting portion 31, by comparing the phases of the voltage of the unbalance component detected by the above-described constitution and the voltage of the transmission signal outputted from the transmitting portion 33 and calculating the product of the both, the direction of the common mode current can be detected along with the value of the unbalance component between the conductors W1, W2 of the transmission lines. Further, by compensating for the phase of the voltage of the transmission signal outputted from the transmitting portion 33, or the phase of the voltage at the middle point of the conductors W1, W2 by the phase shifting circuit and calculating the product of the voltage of the middle point of the conductors W1, W2 by the transmission signal, the direction and an absolute amount of the unbalance component of the transmission lines can accurately be detected.

Fourth Embodiment

Figure 17:
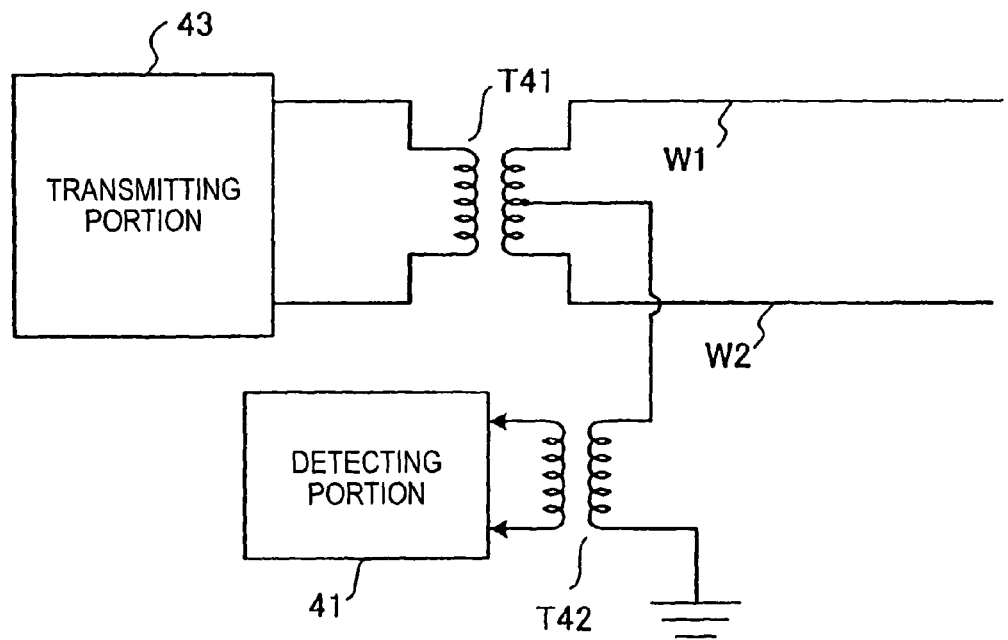
FIG. 17 is a view showing a basic constitution of a line state detecting apparatus according to a fourth embodiment of the invention.

FIG. 17 is a view showing a basic constitution of a line state detecting apparatus according to a fourth embodiment of the invention. The fourth embodiment is constructed by a constitution of detecting the unbalance component by way of a transformer in addition to the constitution of the third embodiment. The line state detecting apparatus of the embodiment is constituted by including, in the transmission lines comprising a pair of the conductors W1, W2 connected to a transmitting portion 43, a transformer T41 for transmission having a middle point tap on a secondary side on a side of the transmission lines inserted between the transmission lines and the transmitting portion 43, a transformer T42 for detection a primary side winding of which is connected between the middle point tap on the secondary side of the transmission transformer T41 and the ground, and a detecting portion 41 for detecting a current or a voltage of a secondary winding of the detection transformer T42.

In the constitution, the detecting portion 41 detects a voltage between the middle point on the secondary side of the transmission transformer T41 and the ground potential by way of the detection transformer T42 by detecting the current or the voltage of the secondary winding of the detection transformer T42. Thereby, a common mode voltage (unbalance voltage) of the conductors W1, W2 of the transmission lines, that is, an unbalance component of a power transmitted from the transmitting portion 43 can be detected in a state of being separated from the transmission lines. Further, according to the constitution of the fourth embodiment, the detecting portion for detecting the unbalance component is provided in the form of being separated from the transmission lines and therefore, an influence on the transmission lines by the detecting portion can be nullified and the unbalance component of the transmission lines can further accurately be detected.

Figure 18:
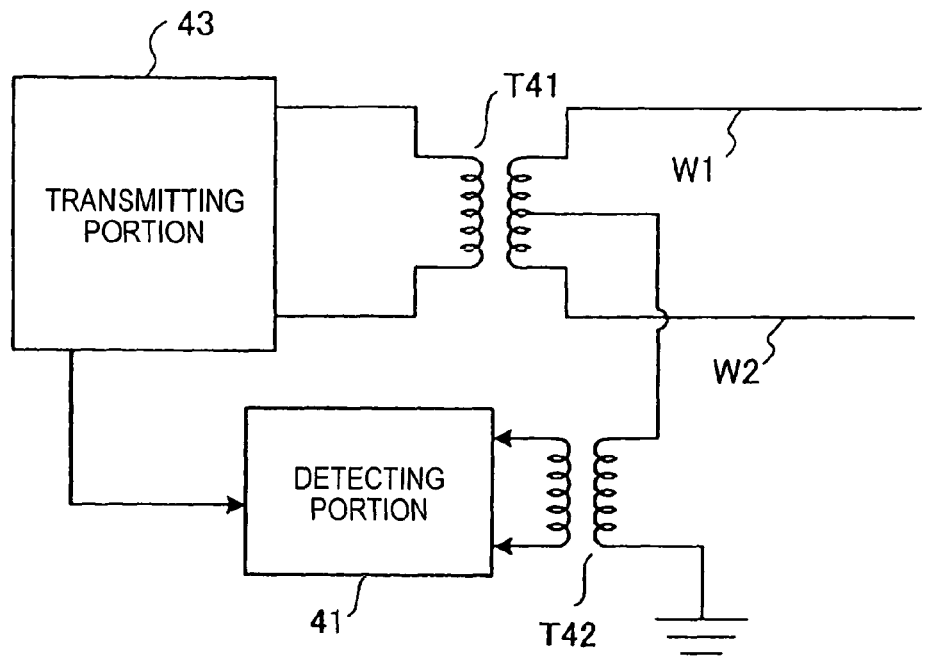
FIG. 18 is a view showing a first modified example of the line state detecting apparatus according to the fourth embodiment.

FIG. 18 shows a first modified example of the line state detecting apparatus according to the fourth embodiment. The first modified example is constructed by a constitution of connecting the transmitting portion 43 to the detecting portion 41 in the constitution of FIG. 17. In the constitution, the detecting portion 41 detects the current or the voltage of the secondary winding of the detection transformer T42, inputs a portion of the transmission signal transmitted from the transmitting portion 43 and compares phases of the transmission signal and a current or a voltage of the unbalance component of the conductors W1, W2 or both thereof. Thereby, a direction of the common mode current can be detected in a state of being separated from the transmission lines along with the amplitude of the unbalance component between the conductors W1, W2.

Further, the line state detecting apparatus of FIG. 18 may be constructed by a constitution of calculating a product of the voltage of the unbalance component of the conductors W1, W2 detected by the detecting portion 41 by the current or the voltage of the transmission signal outputted from the transmitting portion 43 by the detecting portion 41. Thereby, not only an amount of the unbalance component between the conductors W1, W2 of the transmission lines can be detected by a calculated value of the produce but also a direction of the common mode current can be detected by a sign of the calculated value.

Figure 19:
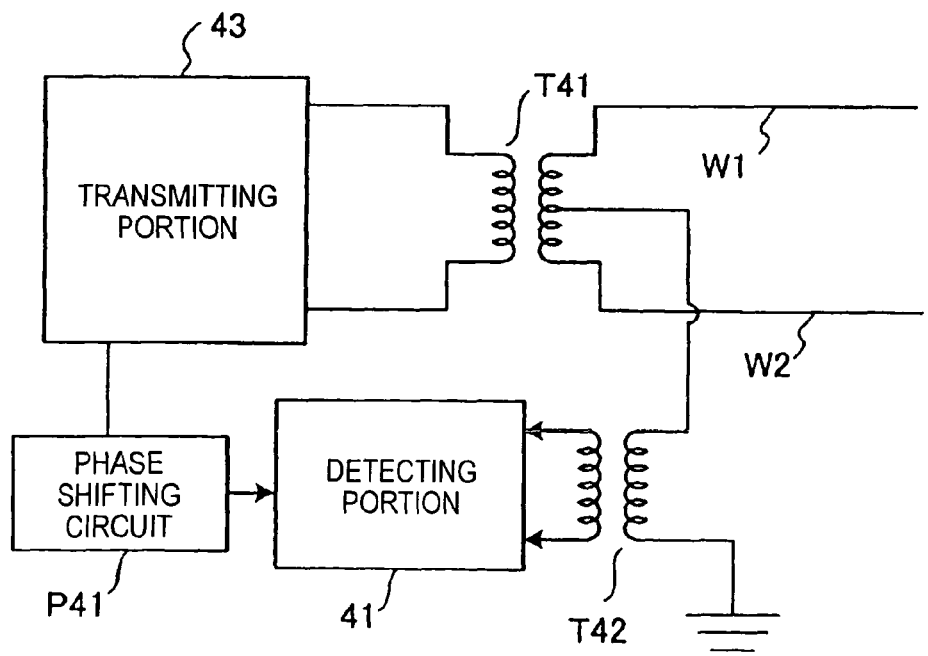
FIG. 19 is a view showing a second modified example of the line state detecting apparatus according to the fourth embodiment.

FIG. 19 shows a second modified example of the line state detecting apparatus according to the fourth embodiment. The second modified example is constructed by a constitution of including a phase shifting circuit P41 for inputting a portion of the transmission signal transmitted from the transmitting portion 43 and shifting the phase of the current or the voltage of the transmission signal to output to the detecting portion 41 in the constitution of FIG. 17. The phase shifting circuit P41 may be either of a circuit of shifting the phase in analog by a delay element or the like and a circuit for executing a phase shifting processing in digital by a digital circuit. In the constitution, the phase shifting circuit P41 compensates for the phase by advancing or retarding the phase of the transmission signal outputted from the transmitting portion 43. The detecting portion 41 detects the current or the voltage of the secondary winding of the detection transformer T42, inputs the transmission signal the phase of which is compensated for by the phase shifting circuit P41 and calculates a product of the voltage of the unbalance component of the conductors W1, W2 by the current or the voltage of the transmission signal. Thereby, a value of the unbalance component between the conductors W1, W2 of the transmission lines and a direction of the common mode current can accurately be detected in a state of being separated from the transmission lines.

Figure 20:
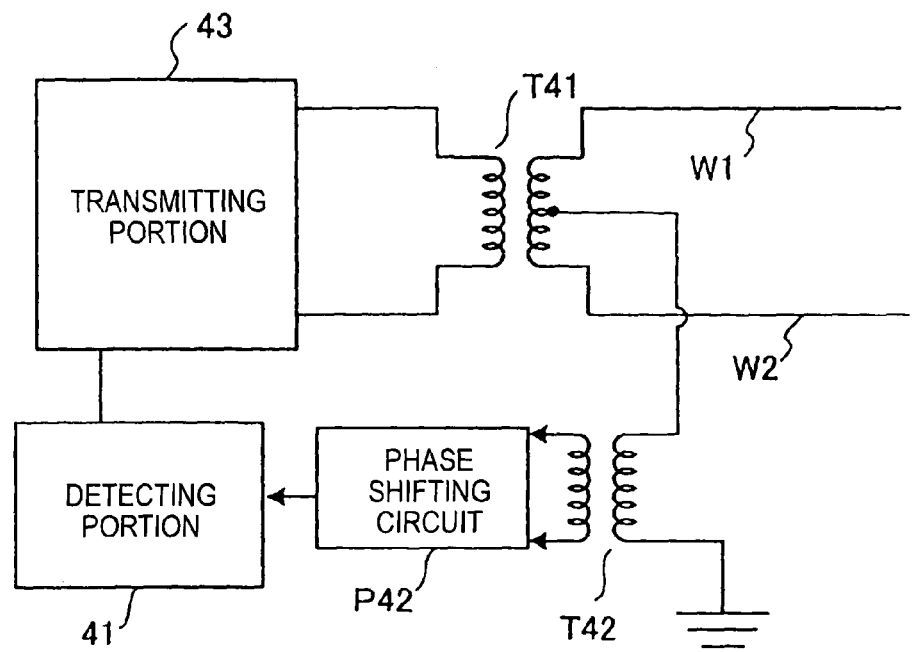
FIG. 20 is a view showing a third modified example of the line state detecting apparatus according to the fourth embodiment.

FIG. 20 shows a third modified example of the line state detecting apparatus according to the fourth embodiment. The third modified example is constructed by a constitution of including a phase shifting circuit P42 for shifting the phase of the current or the voltage of the secondary winding of the detection transformer T42 to output to the detecting portion 41 in the constitution of FIG. 17. The phase shifting circuit 42 may be either of a circuit for shifting the phase in analog by a delay element or the like and a circuit for executing a phase shifting processing in digital by a digital circuit. In the constitution, the phase shifting circuit P42 compensates for the phase by advancing or retarding the phase of the current or the voltage of the secondary winding of the detection transformer T42. The detecting portion 41 inputs the current or the voltage of the secondary winding of the detection transformer T42 the phase of which is compensated for by the phase shifting circuit P42 and a portion of the transmission signal transmitted from the transmitting portion 43 and calculates a product thereof. Thereby, a value of the unbalance component between the conductors W1, W2 of the transmission lines and a direction of the common mode current can accurately be detected in a state of being separated from the transmission lines.

According to the line state detecting apparatus of the fourth embodiment, by detecting the current or the voltage of the secondary winding of the detection transformer T42 by the detecting portion 41 by using the transmission transformer T41 inserted between the transmission lines comprising the conductors W1, W2 and the transmitting portion 43 and having the middle point tap on the secondary side on the side of the transmission lines, and the detection transformer T42 the primary winding of which is connected between the middle point tap on the secondary side of the transmission transformer T41 and the ground, a difference of the currents or the voltages between the conductors W1, W2, that is, the unbalance component can be detected in the state of being separated from the transmission lines.

Further, by comparing the phases of the current or the voltage of the unbalance component detected by the above-described constitution and the current or the voltage of the portion of the transmission signal outputted from the transmitting portion 43 and calculating the product of the both, the direction of the common mode current can be detected along with the value of the unbalance component between the conductors W1, W2 of the transmission lines. Further, by compensating for the phase of the current or the voltage of the transmission signal outputted from the transmitting portion 43, or the phase of the current or the voltage at the middle point of the conductors W1, W2 and calculating the product of the current or the voltage at the middle point of the conductors W1, W2 by the transmission signal, the direction and an absolute amount of the unbalance component of the transmission lines can accurately be detected.

Fifth Embodiment

Figure 21:
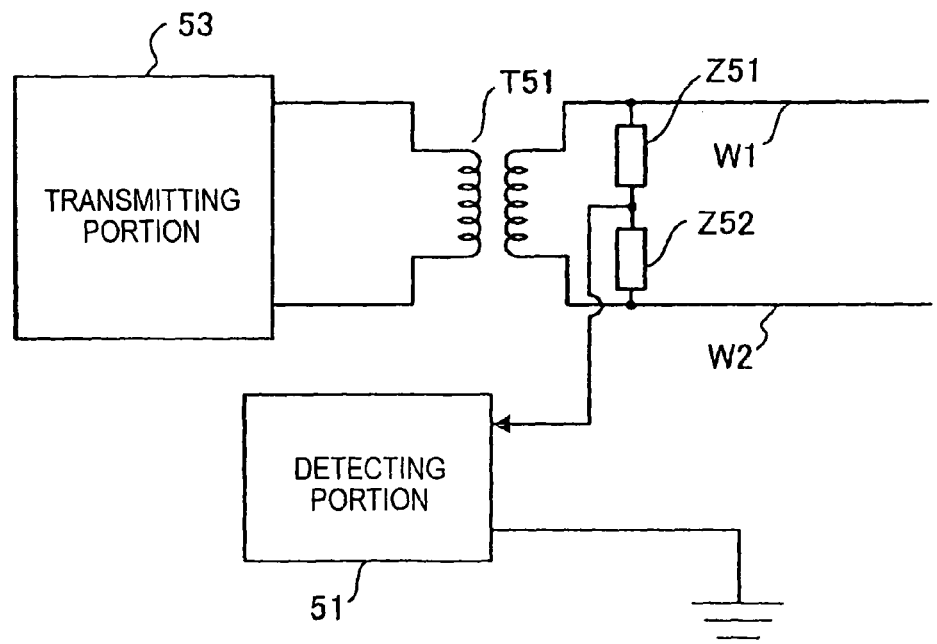
FIG. 21 is a view showing a basic constitution of a line state detecting apparatus according to a fifth embodiment of the invention.

FIG. 21 is a view showing a basic constitution of a line state detecting apparatus according to a fifth embodiment of the invention. The line state detecting apparatus of the embodiment is constructed by a constitution of including, in the transmission lines comprising a pair of the conductors W1, W2 connected to a transmitting portion 53, a transmission transformer T51 inserted between the transmission lines and the transmitting portion 53, two impedances Z51, Z52 connected in series between the conductors W1, W2 on a side of the transmission lines of the transmission transformer T51, and a detecting portion 51 for detecting a voltage between a connecting portion of the impedances Z51, Z52 and the ground potential. By using the two impedances Z52, Z52 having substantially an equal characteristic value, operation similar to that of the middle point of the transmission transformer shown in the third embodiment can be achieved. Further, the impedances Z51, Z52 are not limited to resistors having resistance components but the impedances Z51, Z52 having reactance components may be used.

In the constitution, a common mode voltage (unbalance voltage) of the conductors W1, W2 of the transmission lines can directly be detected by detecting a voltage at an intersection of the impedances Z51, Z52, that is, a voltage of a middle point of the conductors W1, W2 of the transmission lines. Therefore, an unbalance component of a power transmitted from the transmitting portion 53 can be detected by a simple constitution. Further, according to the constitution of the fifth embodiment, the constitution is further simplified by using the two impedances connected in series.

Further, by making the impedances Z51, Z52 provided for detecting the unbalance component of the transmission lines serve also as terminator of the transmission lines, a number of parts can be reduced and a reduction in cost can be achieved.

Figure 22:
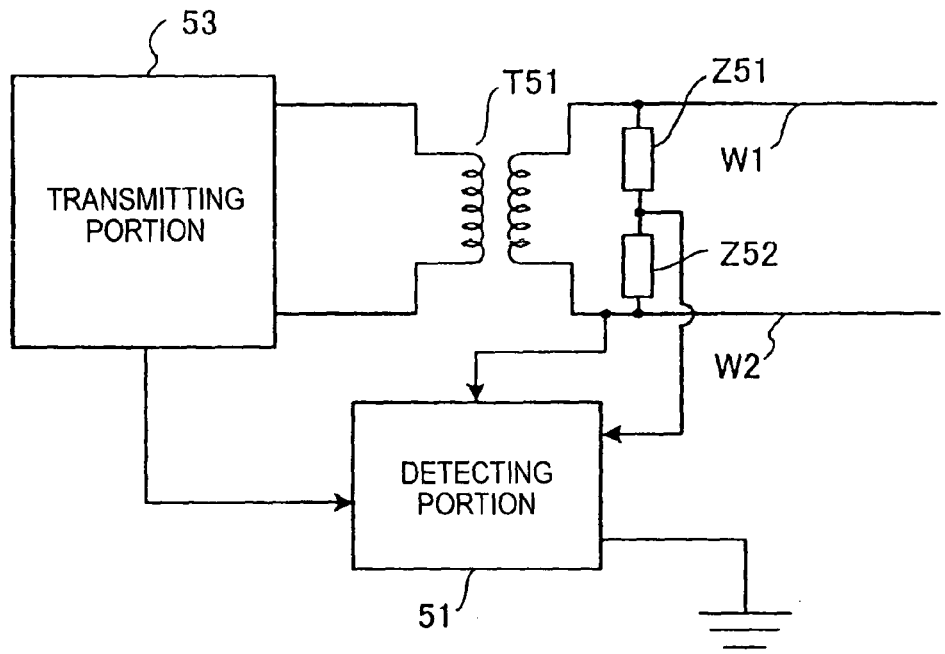
FIG. 22 is a view showing a first modified example of the line state detecting apparatus according to the fifth embodiment.

FIG. 22 shows a first modified example of the line state detecting apparatus according to the fifth embodiment. The first modified example is constructed by a constitution of connecting one of the conductors W1 and W2 (W2 in the example of the drawing) of the conduction lines or the transmitting portion 53 to the detecting portion 51 in the constitution of FIG. 21. In the constitution, the detecting portion 51 detects the voltage at the intersection of the impedances Z51, Z52, inputs a portion of a transmission signal transmitted from the transmitting portion 53 or a carried signal carried by the conductor W1 or W2 and compares phases of the transmission signal or a signal of the conductor W1 or W2 and a voltage of an unbalance component of the conductors W1, W2. Thereby, a direction of the common mode current can be detected along with amplitude of the unbalance component between the conductors W1, W2. Further, in comparing the phases by the detecting portion 51, phases of voltages of both of the conductors W1, W2 may be used.

Further, the line state detecting apparatus of FIG. 22 may be constructed by a constitution of calculating a product of the voltage of the unbalance component of the conductors W1, W2 detected by the detecting portion 51 by the voltage of the transmission signal outputted from the transmitting portion 53 by the detecting portion 51. Thereby, not only an amount of the unbalance component of the conductors W1, W2 of the transmission lines can be detected by a calculated value of the product but also a direction of the common mode current can be detected by a sign of the calculated value.

Figure 23:
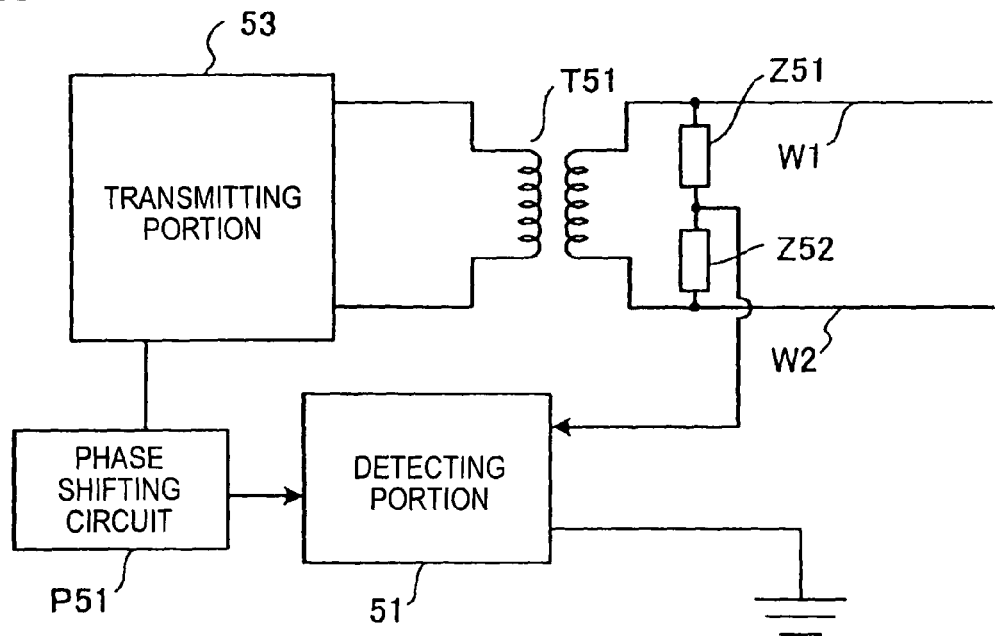
FIG. 23 is a view showing a second modified example of the line state detecting apparatus according to the fifth embodiment.

FIG. 23 shows a second modified example of the line state detecting apparatus according to the fifth embodiment. The second modified example is constructed by a constitution of including a phase shifting circuit P51 for inputting a portion of a transmission signal transmitted from the transmitting portion 53 and shifting a phase of a voltage of the transmission signal to output to the detecting portion 51 in the constitution of FIG. 21. The phase shifting circuit P51 may be either of a circuit of shifting the phase in analog by a delay element or the like and a circuit for executing a phase shifting processing in digital by a digital circuit. In the constitution, the phase shifting circuit P51 compensates for the phase by advancing or retarding a phase of the transmission signal outputted from the transmitting portion 53. The detecting portion 51 detects a voltage between the intersection of the impedances Z51, Z52 and the ground potential, inputs the transmission signal the phase of which is compensated for by the phase shifting circuit P51 and calculates a product of a voltage of the unbalance component of the conductors W1, W2 by the voltage of the transmission signal. Thereby, a value of the unbalance component between the conductors W1, W2 of the transmission lines and a direction of the common mode current can accurately be detected.

Figure 24:
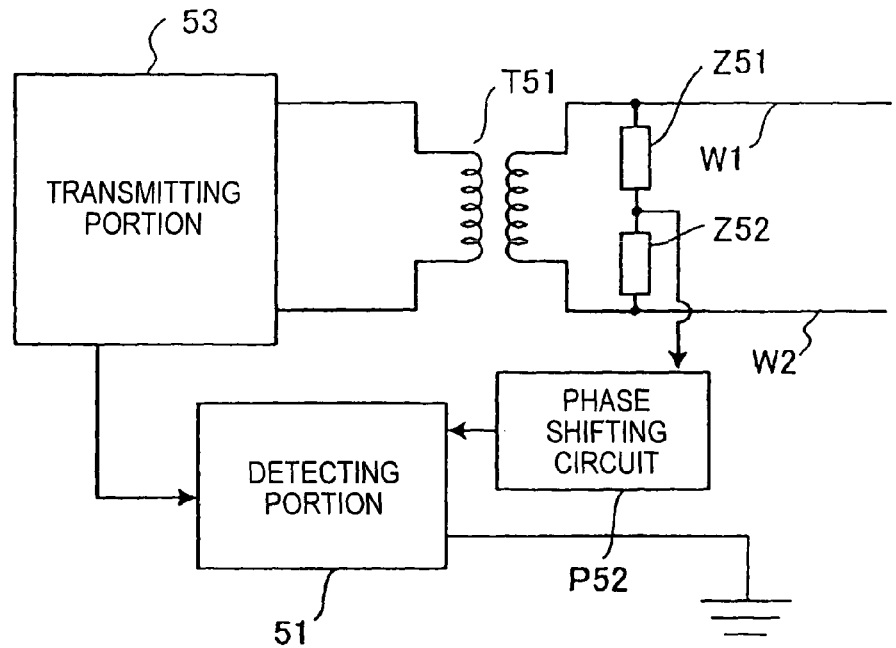
FIG. 24 is a view showing a third modified example of the line state detecting apparatus according to the fifth embodiment.

FIG. 24 shows a third modified example of the line state detecting apparatus according to the fifth embodiment. The third modified example is constructed by a constitution of including a phase shifting circuit P52 for shifting a phase of an unbalance voltage of the transmission lines by the voltage of the intersection of the impedances Z51, Z52 to output to the detecting portion 51 in the constitution of FIG. 21. The phase shifting circuit P51 may be either of a circuit for shifting the phase in analog by a delay element or the like and a circuit for executing a phase shifting processing in digital by a digital circuit. In the constitution, the phase shifting circuit P51 compensates for the phase by advancing or retarding the phase of the voltage of the intersection of the impedances Z51, Z52. The detecting portion 51 inputs the voltage between the intersection of the impedances Z51, Z52 and the ground potential and a portion of the transmission signal transmitted from the transmitting portion 53 and calculates a product thereof. Thereby, a value of the unbalance component between the conductors W1, W2 of the transmission lines and a direction of the common mode current can accurately be detected.

According to the line state detecting apparatus of the fifth embodiment, by detecting the potential of the intersection of the two impedances Z51, Z52 connected in series between the conductors W1, W2 on the side of the transmission lines of the transmission transformer T51 inserted between the transmission lines comprising the conductors W1, W2 and the transmitting portion 53 by the detecting portion 51, a difference of the currents or the voltages between the conductors W1, W2, that is, the unbalance component can directly be detected by a simple constitution.

Further, in the detecting portion 51, by comparing the phases of the voltage of the unbalance component detected by the above-described constitution and the voltage of the transmission signal outputted from the transmitting portion 53 and calculating the product of the both, a direction of the common mode current can be detected along with a value of the unbalance component between the conductors W1, W2 of the transmission lines. Further, by compensating for the phase of the voltage of the transmission signal outputted from the transmitting portion 53 or the phase of the voltage of the middle point of the conductors W1, W2 by the phase shifting circuit and calculating the product of the voltage of the middle point of the conductors W1, W2 by the transmission signal, the direction and an absolute amount of the unbalance component of the transmission lines can accurately be detected.

Sixth Embodiment

Figure 25:
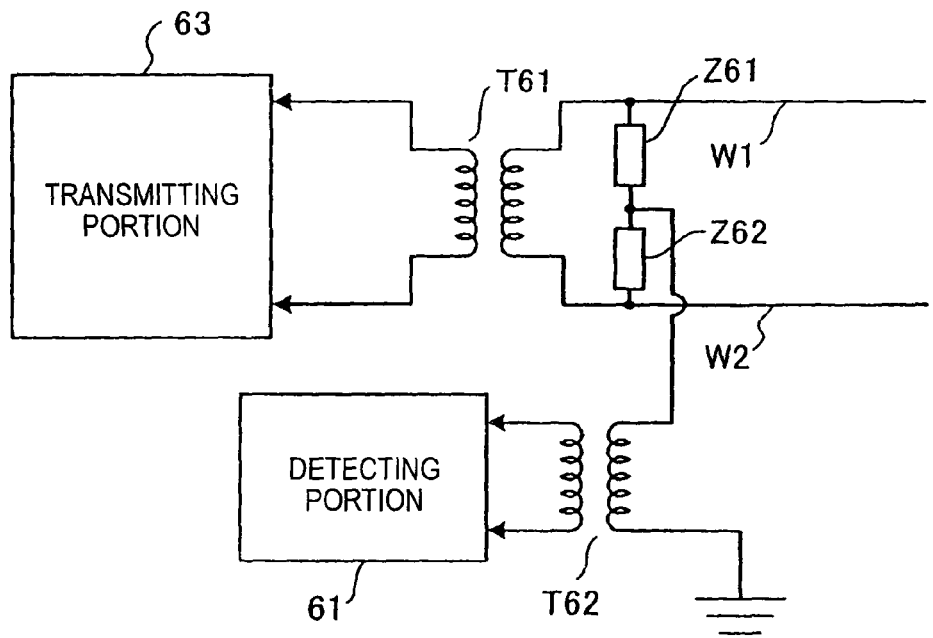
FIG. 25 is a view showing a basic constitution of a line state detecting apparatus according to a sixth embodiment of the invention.

FIG. 25 is a view showing a basic constitution of a line state detecting apparatus according to a sixth embodiment of the invention. The sixth embodiment is constructed by a constitution of detecting the unbalance component by way of a transformer in addition to the constitution of the fifth embodiment. The line state detecting apparatus of the embodiment is constituted by including, in the transmission lines comprising a pair of the conductors W1, W2 connected to a transmitting portion 63, a transmission transformer T61 inserted between the transmitting lines and the transmitting portion 63, two impedances Z61, Z62 connected in series between the conductors W1, W2 on a side of the transmission lines of the transmission transformer T61, a detection transformer T62 a primary winding of which is connected between an intersection of the impedances Z61, Z62 and the ground and a detecting portion 61 for detecting a current or a voltage of a secondary winding of the detection transformer T62.

In the constitution, the detecting portion 61 can directly detect a common mode voltage (unbalance voltage) of the conductors W1, W2 of the transmission lines by detecting a voltage at an intersection of the impedances Z61, Z62, that is, a voltage of a middle point of the conductors W1, W2 of the transmission lines. Therefore, an unbalance component of a power transmitted from the transmitting portion 63 can be detected in a state of being separated from the transmission lines. Further, according to the constitution of the sixth embodiment, the detecting portion for detecting the unbalance component is provided in the form of being separated from the transmission lines and therefore, an influence on the transmission lines by the detecting portion can be nullified and the unbalance component of the transmission lines can further accurately be detected.

Figure 26:
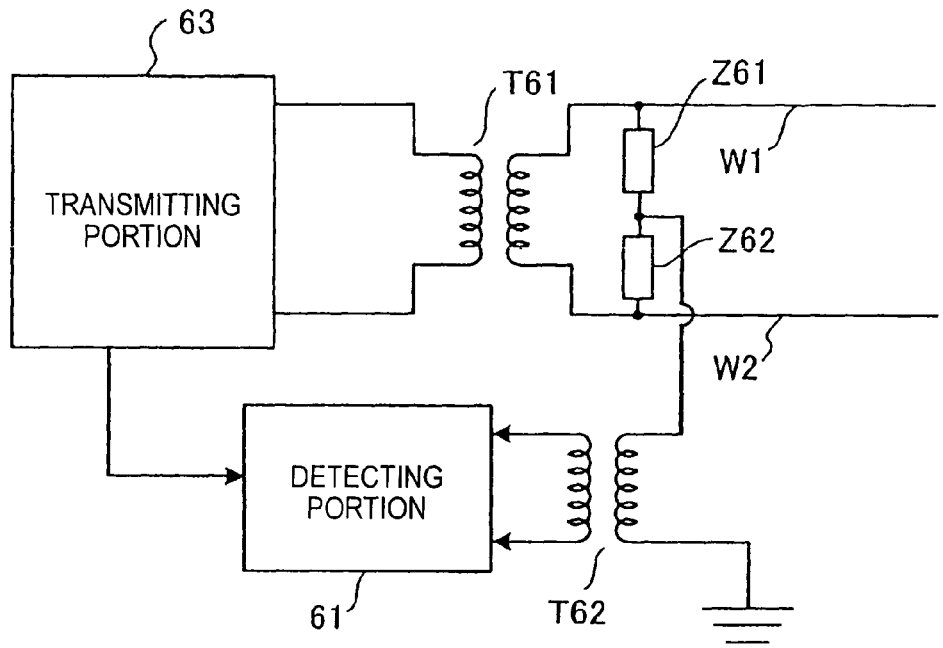
FIG. 26 is a view showing a first modified example of the line state detecting apparatus according to the sixth embodiment.

FIG. 26 shows a first modified example of the line state detecting apparatus according to the sixth embodiment. The first modified example is constructed by a constitution of connecting the transmitting portion 63 to the detecting portion 61 in the constitution of FIG. 25. In the constitution, the detecting portion 61 detects the voltage of the intersection of the impedances Z61, Z62, inputs a portion of the transmission signal transmitted from the transmitting portion 63 and compares phases of the transmission signal and a current or a voltage of the unbalance component of the conductors W1, W2 or both thereof. Thereby, a direction of the common mode current can be detected in a state of being separated from the transmission lines along with amplitude of the unbalance component between the conductors W1, W2.

Further, the line state detecting apparatus of FIG. 26 may be constructed by a constitution of calculating a product of the current or the voltage of the unbalance component of the conductors W1, W2 detected by the detecting portion 61 by the current or the voltage of the transmission signal outputted from the transmitting portion 63 by the detecting portion 61. Thereby, not only an amount of the unbalance component between the conductors W1, W2 of the transmission lines can be calculated by a calculated value of the product but also a direction of the common mode current can be detected by a sign of the calculated value.

Figure 27:
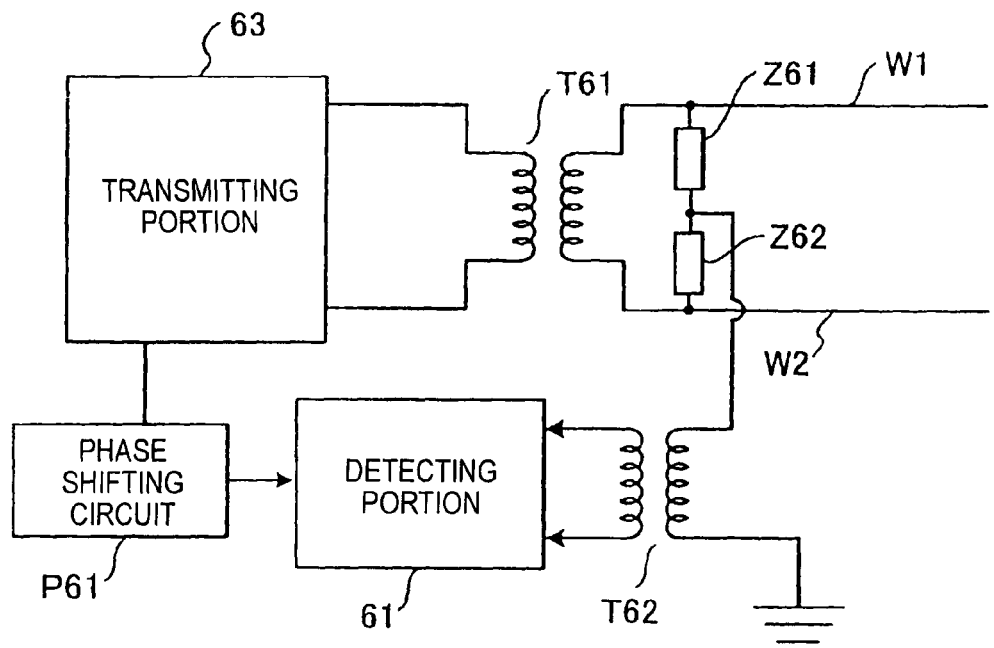
FIG. 27 is a view showing a second modified example of the line state detecting apparatus according to the sixth embodiment.

FIG. 27 shows a second modified example of the line state detecting apparatus according to the sixth embodiment. The second modified example is constructed by a constitution of including a phase shifting circuit P61 for inputting a portion of the transmission signal transmitted from the transmitting portion 63 and shifting a phase of a current or a voltage of the transmission signal to output to the detecting portion 61 in the constitution of FIG. 25. The phase shifting circuit P61 may be either of a circuit for shifting the phase in analog by a delay element or the like and a circuit for executing a phase shifting processing in digital by a digital circuit. In the constitution, the phase shifting circuit P61 compensates for the phase by advancing or retarding the phase of the transmission signal outputted from the transmitting portion 63. The detecting portion 61 detects the voltage of the intersection of the impedances Z61, Z62, inputs the transmission signal the phase of which is compensated for by the phase shifting circuit P61 and calculates a product of the current or the voltage of the unbalance component of the conductors W1, W2 by the current or the voltage of the transmission signal. Thereby, a value of the unbalance component between the conductors W1, W2 of the transmission lines and a direction of the common mode current can accurately be detected in a state of being separated from the transmission lines.

Figure 28:
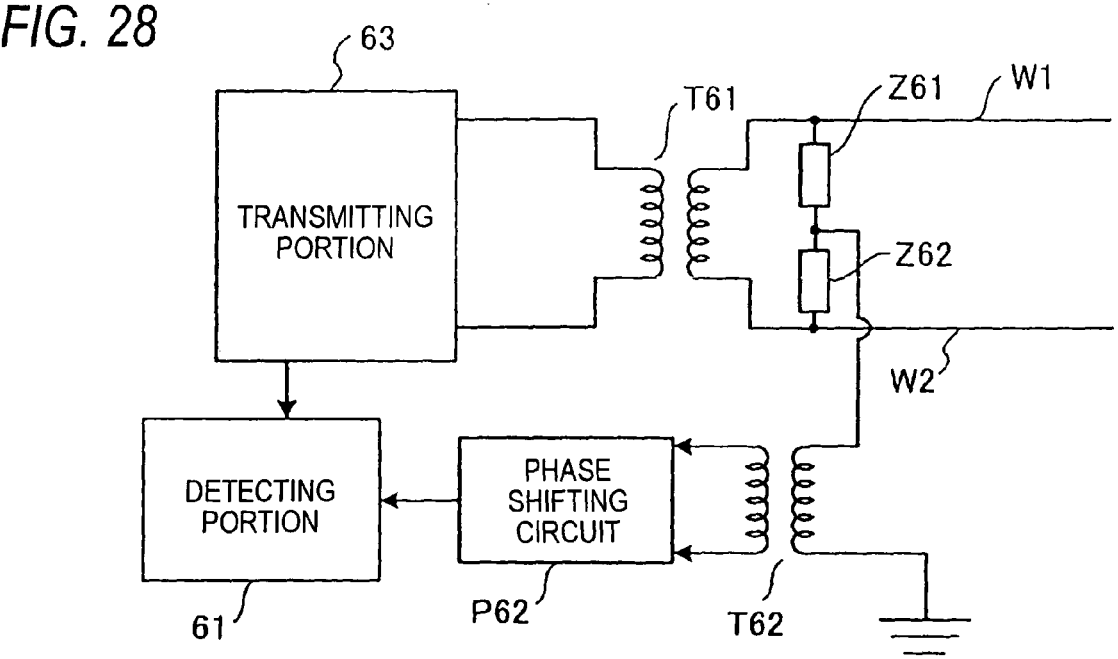
FIG. 28 is a view showing a third modified example of the line state detecting apparatus according to the sixth embodiment.

FIG. 28 shows a third modified example of the line state detecting apparatus according to the sixth embodiment. The third modified example is constructed by a constitution of including a phase shifting circuit P62 for shifting the phase of the unbalance voltage of the transmission lines by the voltage of the intersection of the impedances Z61, Z62 to output to the detecting portion 61 in the constitution of FIG. 25. The phase shifting circuit P62 may be either of a circuit for shifting the phase in analog by a delay element or the like and a circuit for executing a phase shifting processing in digital by a digital circuit. In the constitution, the phase shifting circuit P62 compensates for the phase by advancing or retarding the phase of the voltage at the intersection of the impedances Z61, Z62. The detecting portion 61 inputs a voltage between the intersection of the impedances Z61, Z62 the phase of which is compensated for by the phase shifting circuit P62 and the ground potential and a portion of the transmission signal transmitted from the transmitting portion 63 and calculates a product thereof. Thereby, a value of the unbalance component between the conductors W1, W2 of the transmission lines and a direction of the common mode current can accurately be detected in a state of being separated from the transmission lines.

According to the line state detecting apparatus of the sixth embodiment, by detecting the potential of the intersection of the two impedances Z61, Z62 connected in series between the conductors W1, W2 on the side of the transmission lines of the transmission transformer T61 inserted between the transmission lines comprising the conductors W1, W2 and the transmitting portion 63, a difference of the current or the voltage between the conductors W1, W2, that is, the unbalance component can be detected in the state of being separated from the transmission lines.

Further, in the detecting portion 61, by comparing the phases of the voltage of the unbalance component detected by the above-described constitution and the voltage of the transmission signal outputted from the transmitting portion 63 and calculating the product of the both, a direction of the common mode current can be detected along with a value of the unbalance component between the conductors W1, W2 of the transmission lines. Further, by compensating for the phase of the voltage of the transmission signal outputted from the transmitting portion 63 or the phase of the voltage of the middle point of the conductors W1, W2 by the phase shifting circuit and calculating the product of the voltage of the middle point of the conductors W1, W2 by the transmission signal, the direction and the absolute amount of the unbalance component of the transmission lines can accurately be detected.

Seventh Embodiment

Figure 29:
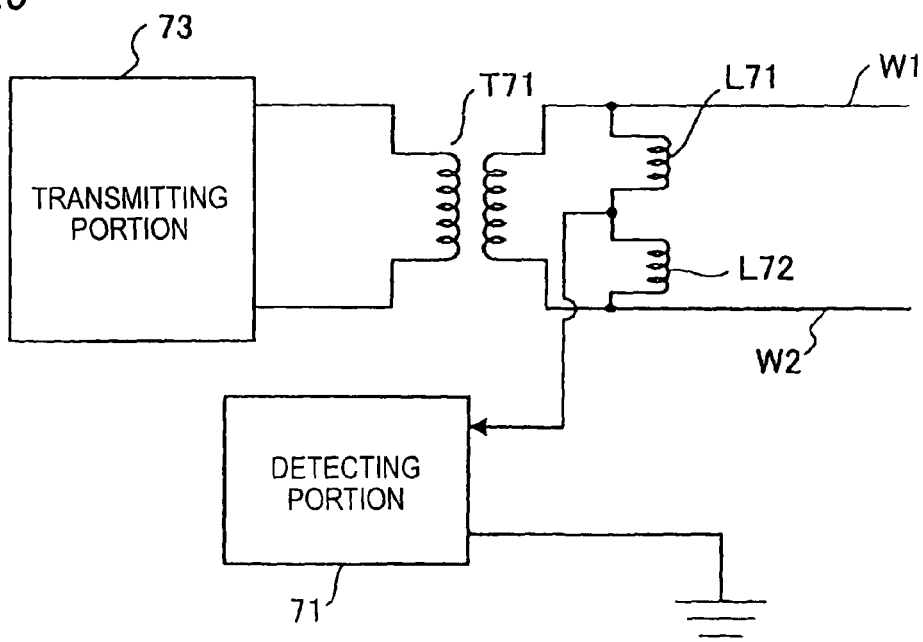
FIG. 29 is a view showing a basic constitution of a line state detecting apparatus according to a seventh embodiment of the invention.

FIG. 29 is a view showing a basic constitution of a line state detecting apparatus according to a seventh embodiment of the invention. The line state detecting apparatus of the embodiment is constructed by a constitution of including, in the transmission lines comprising a pair of the conductors W1, W2 connected to a transmitting portion 73, a transmission transformer T71 inserted between the transmission lines and the transmitting portion 73, two coils L71, L72 having substantially an equal value connected in series between the conductors W1, W2 on a side of the transmission lines of the transmission transformer T71, and a detecting portion 71 for detecting a voltage between a connecting portion of the coils L71, L72 and a ground potential.

In the constitution, by detecting a voltage at an intersection of the coils L71, L72, that is, a voltage of a middle point of the conductors W1, W2 of the transmission lines, a common mode voltage (unbalance voltage) of the conductors W1, W2 of the transmission lines can directly be detected. Therefore, an unbalance component of a power transmitted from the transmitting portion 73 can be detected by a simple constitution. Further, according to the constitution of the seventh embodiment, the constitution is further simplified by using the two coils connected in series.

Further, a first modified example may be constructed by a constitution of providing a detection transformer a primary winding of which is connected between the intersection of the coils L71, L72 and the ground and detecting a current or a voltage of a second winding of the detection transformer by the detecting portion 71. Thereby, the unbalance component can be detected in a state of being separated from the transmission lines.

Further, a second modified example may be constructed by a constitution of inputting a portion of a transmission signal transmitted from the transmitting portion 73 and a carried signal carried by the conductor W1 or W2 to the detecting portion 71 and comparing phases of the transmission signal and the voltage of the unbalance component of the conductors W1, W2 by the detecting portion 71. Thereby, a direction of the common mode current can be detected along with amplitude of the unbalance component between the conductors W1, W2. Further, in comparing the phases by the detecting portion 71, a phase(s) of either one or both of the voltages of the conductors W1, W2 may be used.

Further, a third modified example may be constructed by a constitution of calculating a product of the voltage of the unbalance component of the conductors W1, W2 detected by the detecting portion 71 by the voltage of the transmission signal outputted from the transmitting portion 73 by the detecting portion 71. Thereby, not only an amount of the unbalance component between the conductors W1, W2 of the transmission lines can be detected by a calculated value of the product but also a direction of the common mode current can be detected by a sign of the calculated value.

According to the line state detecting apparatus of the seventh embodiment, by detecting the potential of the intersection of the two coils L71, L72 connected in series between the conductors W1, W2 on a side of the transmission lines of the transmission transformer T71 inserted between the transmission lines comprising the conductors W1, W2 and the transmitting portion 73 by the detecting portion 71, a difference of the current or the voltage between the conductors W1, W2, that is, the unbalance component can be detected by a simple constitution.

Eighth Embodiment

Figure 30:
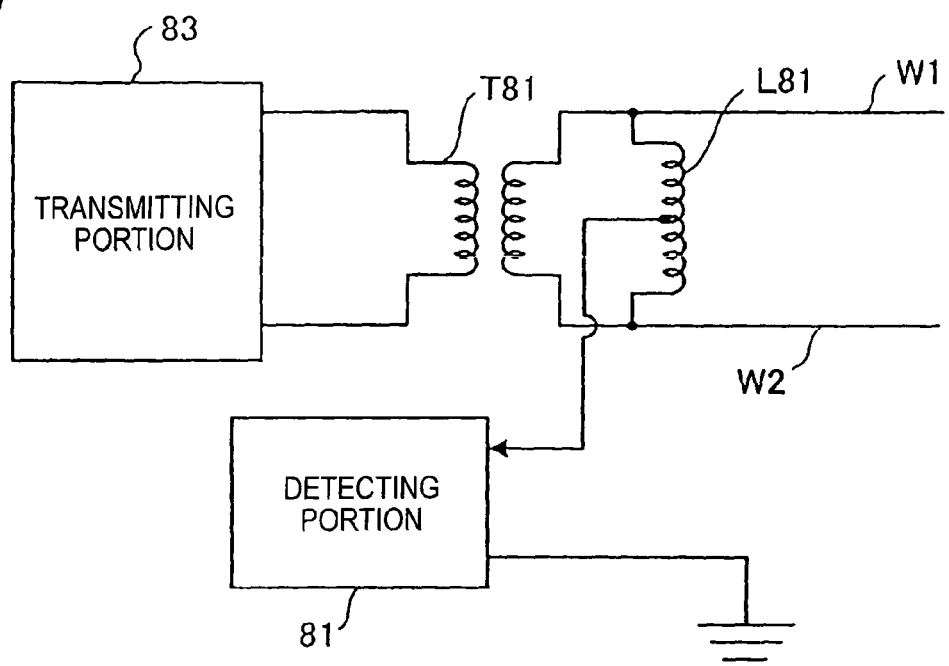
FIG. 30 is a view showing a basic constitution of a line state detecting apparatus according to an eighth embodiment of the invention.
Figure 31:
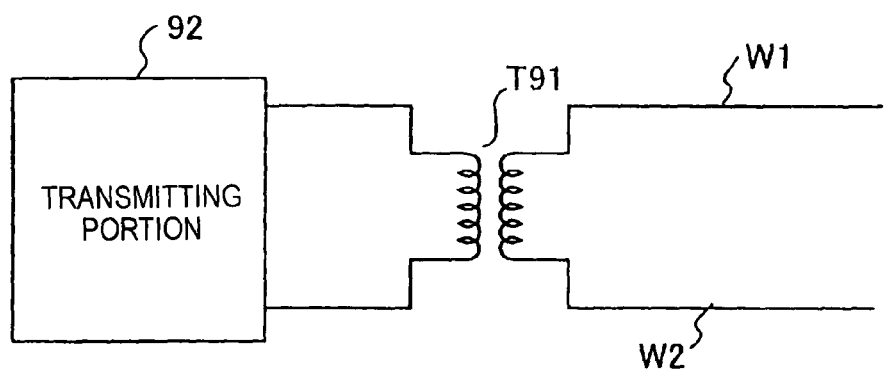
FIG. 31 is a view showing examples of a transmitting portion and a transmission line of a balanced transmission apparatus of a background art.

FIG. 30 is a view showing a basic constitution of a line state detecting apparatus according to an eighth embodiment of the invention. The line state detecting apparatus of the embodiment is constructed by a constitution including, in the transmission lines comprising a pair of the conductors W1, W2 connected to a transmitting portion 83, a transmission transformer T81 inserted between the transmission lines and the transmitting portion 83, a coil L81 having a middle point tap inserted between the conductors W1, W2 on a side of the transmission lines of the transmission transformer T81 and a detecting portion 81 for detecting a voltage between a middle point of the coil L81 and the ground potential.

In the constitution, the detecting portion 81 can directly detect a common mode voltage (unbalance voltage) of the conductors W1, W2 of the transmission lines by detecting a voltage at the middle point of the coil L81, that is, a voltage of the middle point of the conductors W1, W2 of the transmission lines. Therefore, an unbalance component of a power transmitted from the transmitting portion 83 can be detected by a simple constitution. Further, according to the constitution of the eighth embodiment, by using the coil having the middle point tap, the constitution is further simplified.

Further, a first modified example may be constructed by a constitution of providing a detection transformer a primary winding of which is connected between the middle point of the coil L81 and the ground and detecting a current or a voltage of a secondary winding of the detecting transformer by the detecting portion 81. Thereby, the unbalance component can be detected in a state of being separated from the transmission lines.

Further, a second modified example may be constructed by a constitution of inputting a portion of a transmission signal transmitted from the transmitting portion 83 or a carried signal carried by the conductor W1 or W2 to the detecting portion 81 and comparing phases of voltages of the transmission signal and the unbalance component of the conductors W1, W2 by the detecting portion 81. Thereby, a direction of the common mode current can be detected along with amplitude of the unbalance component between the conductors W1, W2. Further, in comparing the phases by the detecting portion 81, a phase(s) of either one or both of the voltages of the conductors W1, W2 may be used.

Further, a third modified example may be constructed by a constitution of calculating a product of the voltage of the unbalance component of the conductors W1, W2 detected by the detecting portion 81 by the voltage of the transmission signal outputted from the transmitting portion 83 by the detecting portion 81. Thereby, not only an amount of the unbalance component between the conductors W1, W2 of the transmission lines can be detected by a calculated value of the product but also a direction of the common mode current can be detected by a sign of the calculated value.

According to the line state detecting apparatus of the eighth embodiment, by detecting the potential of the middle point of the coil L81 connected between the conductors W1, W2 on the side of the transmission lines of the transmission transformer inserted between the transmission lines comprising the conductors W1, W2 and the transmitting portion 83 by the detecting portion 81, a difference of the currents or the voltages between the conductors W1, W2, that is, the unbalance component can be detected by a simple constitution.

Further, in the above-describe first through eighth embodiments, there may be constructed a constitution of detecting the unbalance component between the conductors W1, W2 in consideration of a timing of outputting the transmission signal by using the transmission signal transmitted from the transmitting portion. For example, when the transmission signal is not outputted, by stopping to operate the detecting portion or the differential circuit or making the output of the differential circuit OFF, a detected output of the unbalance component between the conductors W1, W2 can be excluded when the transmission signal is not transmitted.

Further, although in the above-described first through eighth embodiments, there are shown constitution examples in which respective constituent elements are expressed by electronic elements of circuit blocks, transformers and the like, the invention is not limited to the above-described constitution examples so far as the constitutions are provided with similar operation or function but can be realized by various constitutions of combinations of analog circuits, digital circuits and electronic elements. Further, functions of the respective constituent elements may be constructed by constitutions realized by a hardware processing or a software processing. Further, small-sized formation of the apparatus can also be achieved by integrating a portion or a total of the circuits.

Further, when a correction is executed as in compensating for the phase in detecting the unbalance component and controlling the degree of balance of the transmission lines based on the detected unbalance component, the correction may be constructed by a constitution of correcting a shift amount relative to a correction target value as a correction amount, or contrary thereto, constructed by a constitution of correcting a difference between the correction target value and the shift amount as a correction amount.

As described above, according to the invention, the balanced state of the transmission lines in the balanced transmission system can be detected, the balanced state of the transmission lines can be controlled by controlling a level of the transmission signal transmitted to the transmission lines and the degree of balance can be promoted based on the result of detection. Thereby, the power leaked from the transmission lines to outside can be reduced and the deterioration in the characteristic of transmitting data or interference to outside can be restrained. For example, the invention can achieve a further significant effect when applied to the balanced transmission system of a power line communication system or the like using a power line in the transmission line.

Ninth Embodiment

Figure 34:
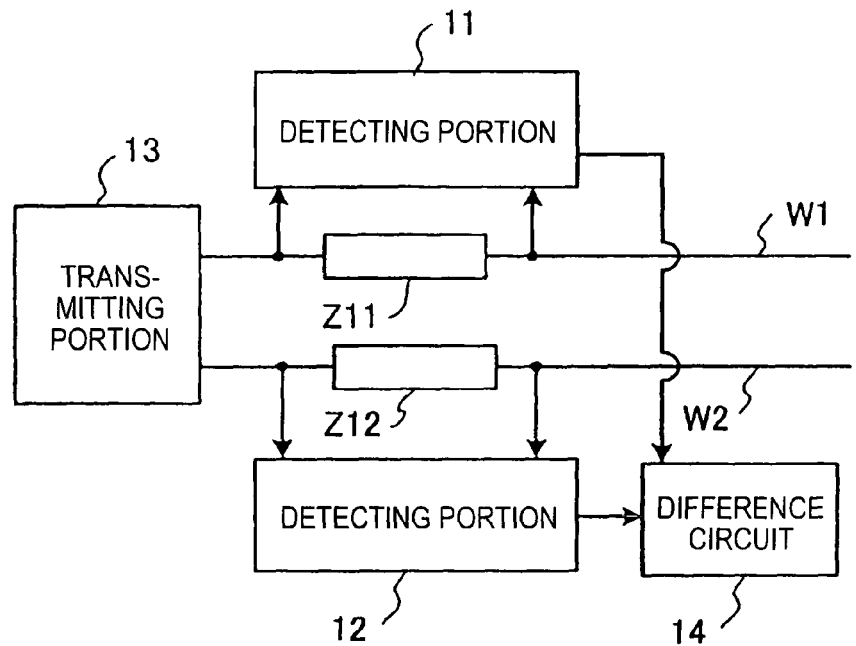
FIG. 34 is a view showing a basic constitution of a line state detecting apparatus according to a ninth embodiment of the invention.

FIG. 34 is a view showing a basic constitution of a line state detecting apparatus according to a ninth embodiment of the invention. The line state detecting apparatus of the embodiment includes impedances Z11, Z12 respectively inserted transmission lines on a forward line side and a rearward line side comprising a pair of conductors W1, W2 connected to a transmitting portion 13 in series therewith. Further, the line state detecting apparatus is constituted by including a first detecting portion 11 and a second detecting portion 12 for respectively detecting voltages of the impedances Z11, Z12 and a differential circuit 14 for detecting a difference of currents or common mode components of voltages of a forward line and a rearward line of respective outputs of the first detecting portion 11 and the second detecting portion 12. Further, as the differential circuit 14, any circuit can be used so far as the circuit includes an adding circuit, a subtracting circuit or the like and can detect the difference of the currents or the voltages of the conductors W1, W2.

According to the constitution, the first detecting portion 11 and the second detecting portion 12 can detect the currents respectively flowing in the conductors W1, W2 by respectively detecting voltages across both ends of the impedances Z11, Z12. Further, in the differential circuit 14, by calculating the difference of the currents or the common mode components of the voltages of the forward line and the rearward line of an output of the first detecting portion 11 and an output of the second detecting portion 12, a common mode current (unbalance current) component between the conductors W1, W2, that is, an unbalance component of a power transmitted from the transmitting portion 13 can be detected.

Figure 35:
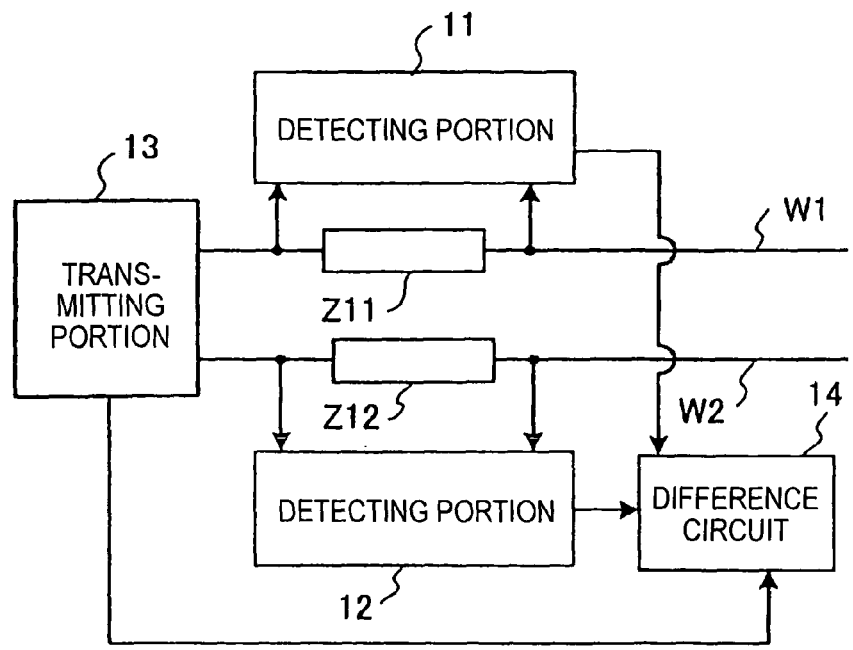
FIG. 35 is a view showing a first modified example of the line state detecting apparatus according to the ninth embodiment.

FIG. 35 shows a first modified example of the line state detecting apparatus according to the ninth embodiment. The first modified example is constructed by a constitution of connecting the transmitting portion 13 to the differential circuit 14 in the constitution of FIG. 34. In the constitution, the differential circuit 14 calculates the difference of the currents of the forward line and the rearward line of the outputs detected by the first and the second detecting portions 11, 12, inputs a portion of the transmission signal transmitted from the transmitting portion 13 and compares phases of the current or the voltage of the transmission signal and the common mode voltage and common mode current of the difference between the forward line and the rearward line of the conductors W1, W2 detected by the first and the second detecting portions 11, 12. Thereby, a direction of the common mode current can be detected along with amplitude of the unbalance component between the conductors W1, W2. Further, when the phases of the transmission signal outputted from the transmitting portion 13 and the current or the voltage in the transmission line are compared, either of the voltage or the current detected at the conductor W1 or the conductor W2 may be used in place of the transmission signal outputted from the transmitting portion 13.

Further, the line state detecting apparatus of FIG. 35 may be constructed by a constitution of calculating a product of the difference of the currents or the common mode component of the voltages of the forward line and the rearward line of the conductors W1, W2 detected by the first and the second detecting portion 11, 12 by the current or the voltage of the transmission signal outputted from the transmitting portion 13 by the differential circuit 14. Thereby, an amount of the common mode current between the conductors W1, W2 of the transmission lines can be calculated by the calculated value of the product and a direction of the common mode current can be detected by a sign of the calculated value.

Figure 36:
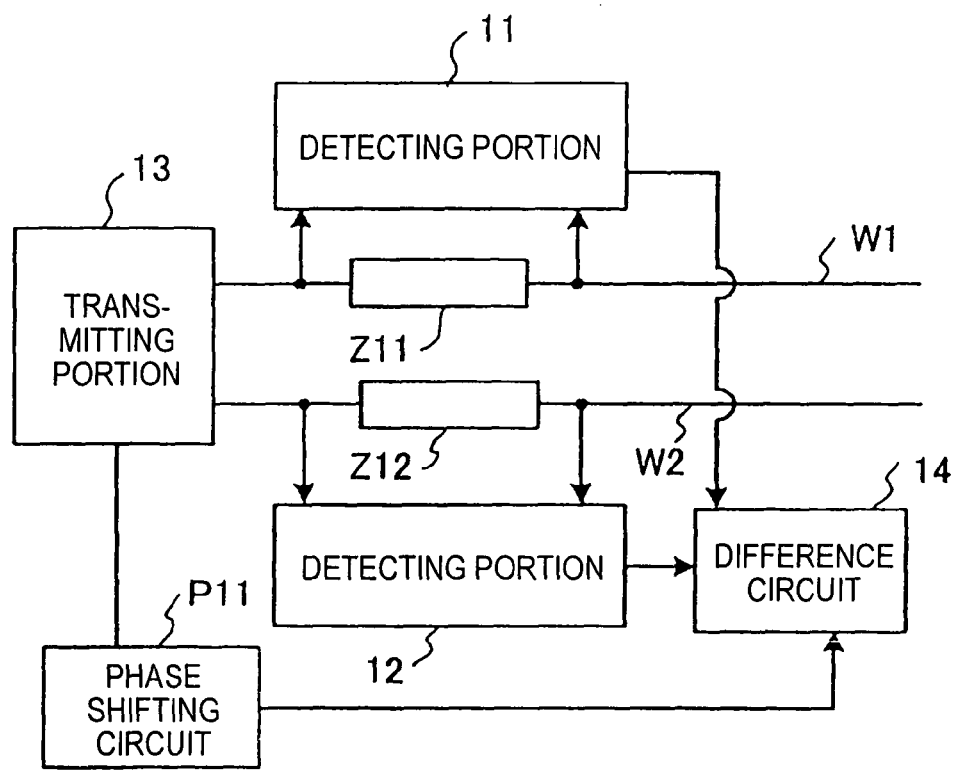
FIG. 36 is a view showing a second modified example of the line state detecting apparatus according to the ninth embodiment.

FIG. 36 shows a second modified example of the line state detecting apparatus according to the ninth embodiment. The second modified example is constructed by a constitution of including a phase shifting circuit P11 for inputting a portion of the transmission signal transmitted from the transmitting portion 13 and shifting a phase of the current or the voltage of the transmission signal to output to the differential circuit 14 in the constitution of FIG. 34. The phase shifting circuit P11 may be either of a circuit of shifting the phase in analog by a delay element or the like and a circuit of executing a phase shifting processing in digital by a digital circuit. In the constitution, the phase shifting circuit P11 compensates for the phase by advancing or retarding the phase of the transmission signal outputted from the transmitting portion 13. The differential circuit 14 calculates the difference of the outputs detected by the first and the second detecting portions 11, 12, inputs the transmission signal the phase of which is compensated for by the phase shifting circuit P11 and calculates a product of the common phase component of the voltages or the difference of the currents of the forward line or the rearward line of the conductors W1, W2 by the current or the voltage of the transmission signal. Thereby, the direction and the current value of the common mode current between the conductors W1, W2 of the transmission lines can accurately be detected.

Figure 37:
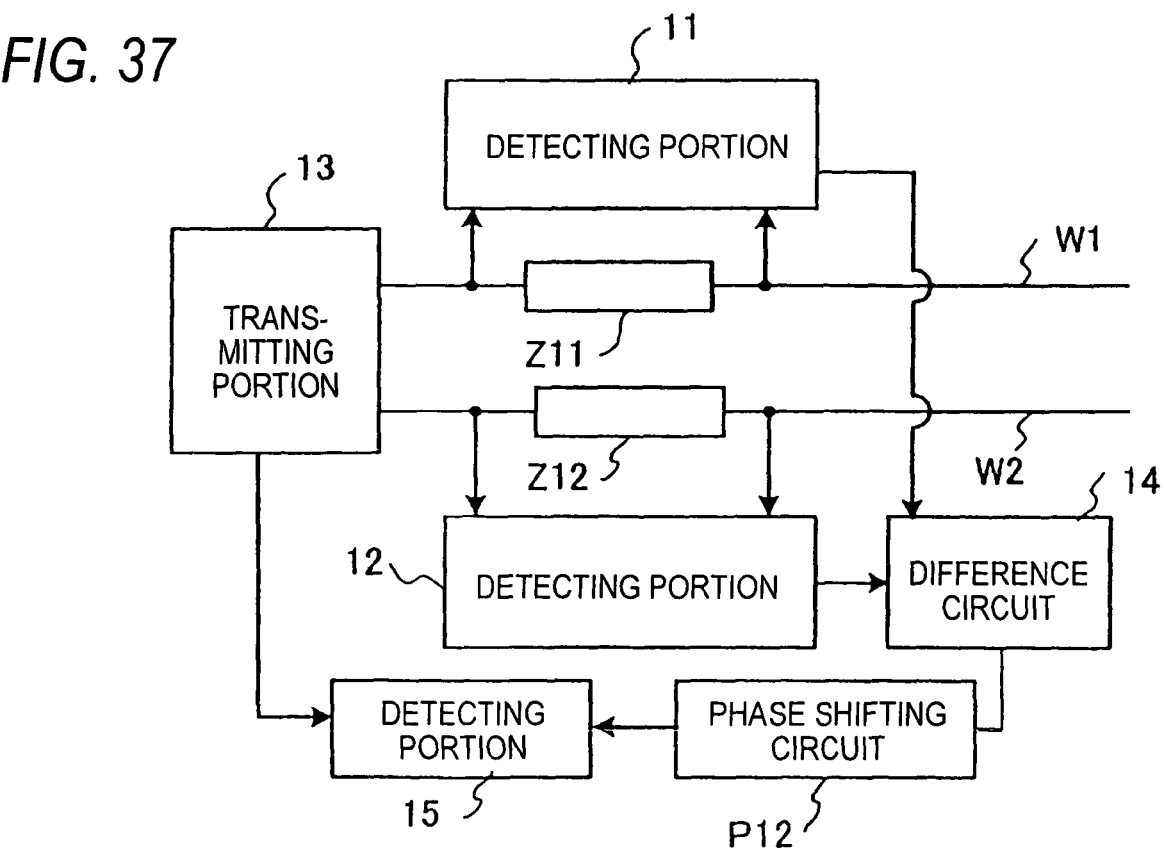
FIG. 37 is a view showing a third modified example of the line state detecting apparatus according to the ninth embodiment.

FIG. 37 shows a third modified example of the line state detecting apparatus according to the ninth embodiment. The third modified example is constructed by a constitution of including a phase shifting circuit P12 for shifting the phase of the difference of the respective outputs of the first and the second detecting portions 11, 12 calculated by the differential circuit 14 and a third detecting portion 15 for inputting an output of the phase shifting circuit P12 and a portion of the transmission signal transmitted from the transmitting portion 13 and calculating a product thereof in the constitution of FIG. 34. The phase shifting circuit P12 may be either of a circuit of shifting the phase in analog by a delay element or the like and a circuit of executing a phase shifting processing in digital by a digital circuit. In the constitution, the phase shifting circuit P12 compensates for the phase by advancing or retarding the phase of the difference of the outputs detected by the first and the second detecting portions 11, 12 detected by the differential circuit 14. The third detecting portion 14 calculates the product of the difference of the currents or the common phase component of the voltages of the forward line and the rearward line between the conductors W1, W2 the phase of which is compensated for by the phase shifting circuit P12 by the current or the voltage of the transmission signal outputted from the transmitting portion 13. Thereby, the direction and the current value of the common mode current between the conductors W1, W2 of the transmission lines can accurately be detected.

According to the line state detecting apparatus of the ninth embodiment, the currents respective flowing in the conductors W1, W2 can be detected by detecting the voltages across the both ends of the impedances Z11, Z12 respectively inserted to the conductors W1, W2 constituting the transmission lines in series therewith by the first and the second detecting portions 11, 12, and the unbalance component between the conductors W1, W2 can be detected by calculating the difference of the detected values by the differential circuit 14.

Further, in the differential circuit 14, the direction of the common mode current can be detected along with the value of the unbalance component between the conductors W1, W2 of the transmission lines by comparing the current or the voltage of the unbalance component detected by the above-described constitution and the phase of the current or the voltage of the portion of the transmission signal outputted from the transmitting portion 13, or calculating the product of the both. Further, the direction and an absolute amount of the unbalance component in the transmission lines can accurately be detected by compensating for the phase of the current or the voltage of the transmission signal outputted from the transmitting portion 13, or the phase of the current or the voltage between the conductors W1, W2 of the transmission lines calculated by the differential circuit 14 and calculating the product.

Tenth Embodiment

Figure 38:
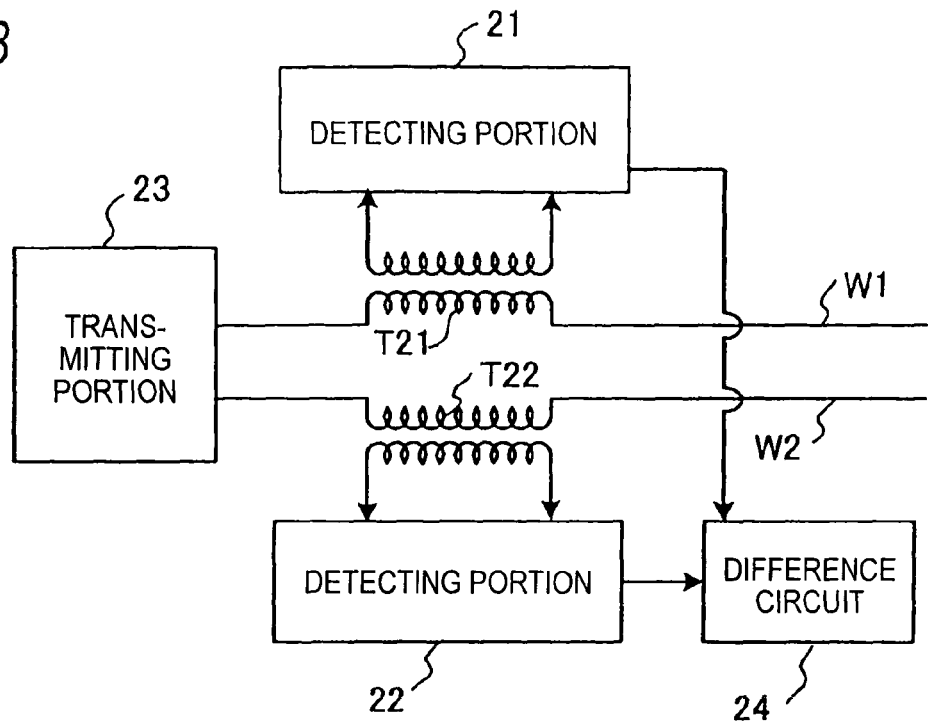
FIG. 38 is a view showing a basic constitution of a line state detecting apparatus according to a tenth embodiment of the invention.

FIG. 38 is a view showing a basic constitution of a line state detecting apparatus according to a tenth embodiment of the invention. The line state detecting apparatus of the embodiment includes current transformers T21, T22 primary sides (primary windings) of which are respectively inserted to the transmission lines on the forward line side and the rearward line side comprising the pair of conductors W1, W2 connected to a transmitting portion 23 in series therewith. Further, the line state detecting apparatus is constructed by a constitution of including a first detecting portion 21 and a second detecting portion 22 for respectively detecting voltages of secondary sides (secondary windings) of the current transformers T21, T22 and a differential circuit 24 for detecting a difference of currents of the forward line and the rearward line of respective outputs of the first detecting portion 21 and the second detecting portion 22. Further, as the differential circuit 22, any circuit can be used so far as the circuit is a circuit including an adding circuit, a subtracting circuit or the like and can detect a difference of currents or voltages of the conductors W1, W2.

In the constitution, the first detecting portion 21 and the second detecting portion 22 can detect the currents respectively flowing in the conductors W1, W2 in a state of being separated from the transmission lines by respectively detecting voltages generated on the secondary sides of the current transformers T21, T22. Further, the differential circuit 24 can detect an unbalance component of a common mode current (unbalance current) component between the conductors W1, W2, that is, a power outputted from the transmitting portion 23 by calculating a difference of the currents of the forward line and the rearward line of an output of the first detecting portion 21 and an output of the second detecting portion 22.

Figure 43:
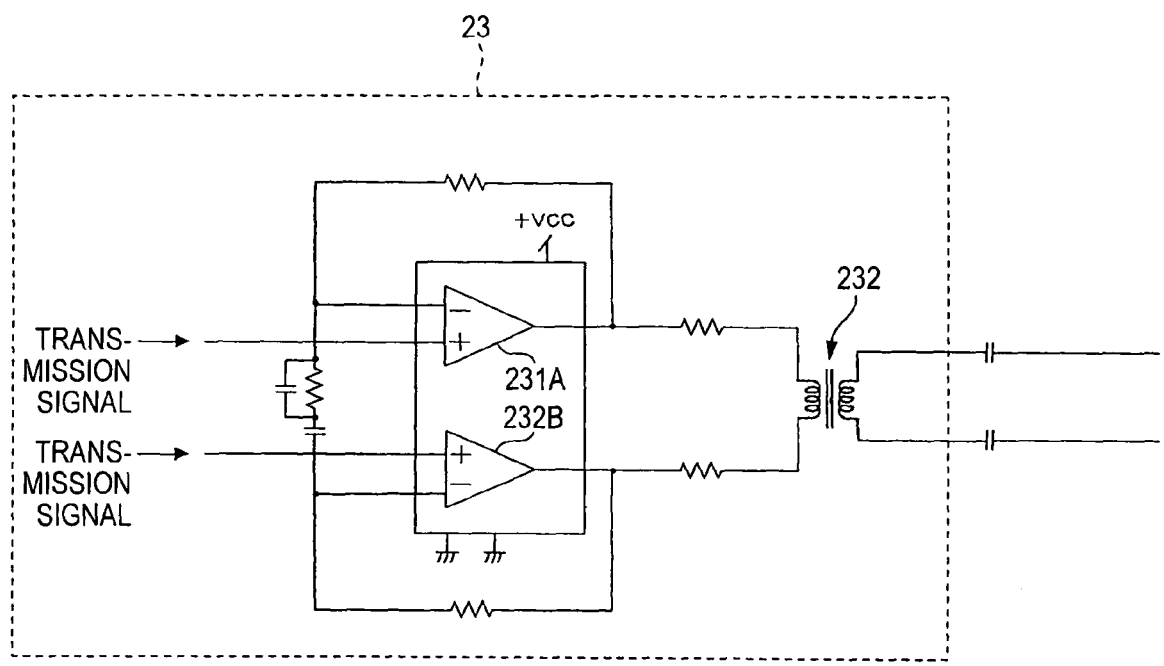
FIG. 43 shows an example of a detailed circuit diagram of the transmitting portion.
Figure 44:
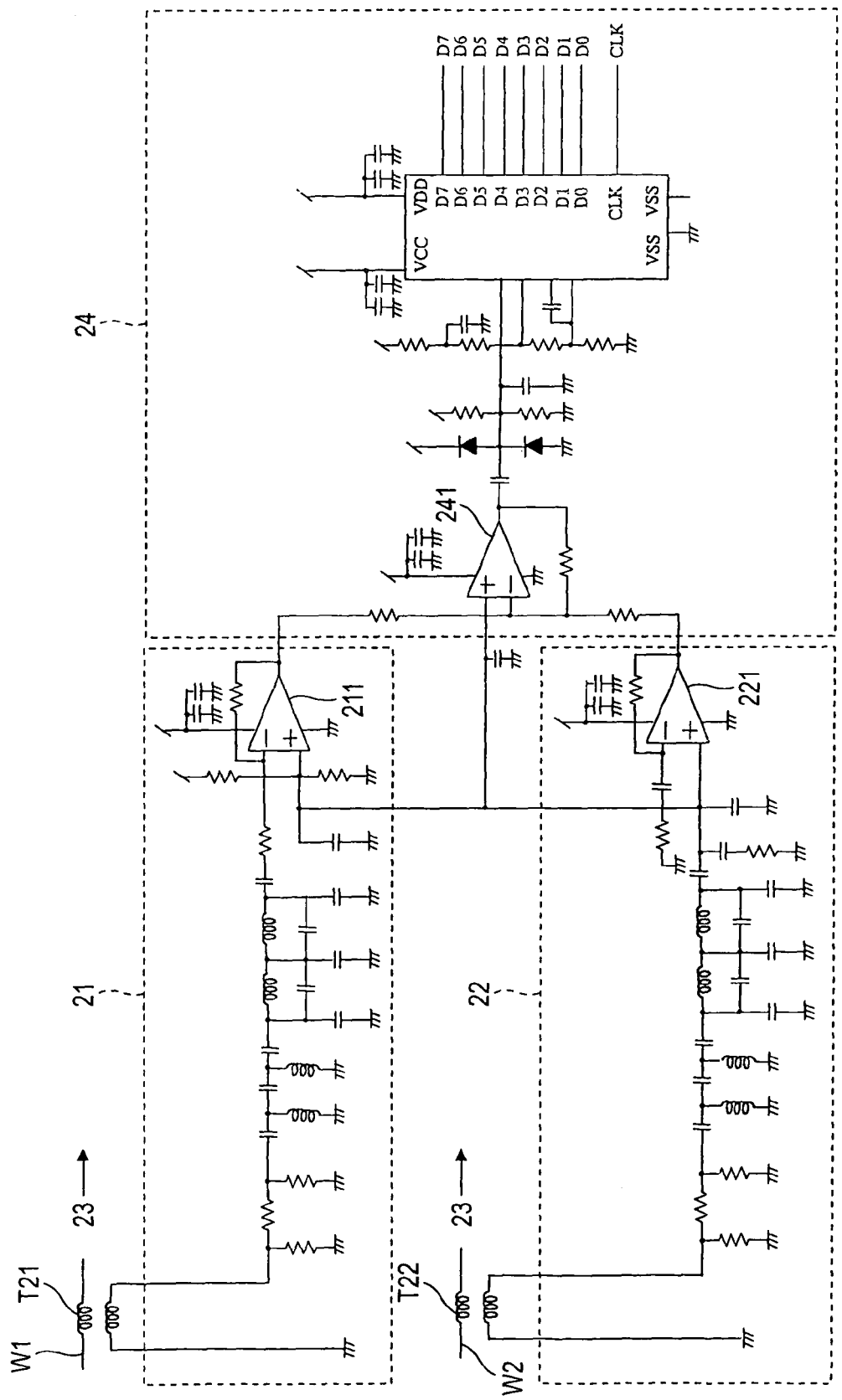
FIG. 44 shows examples of detailed circuit diagrams of the detecting portions and the differential circuit.

Here, a detailed circuit constitution of the line state detecting apparatus will be explained. FIG. 43 shows an example of a detailed circuit diagram of the transmitting portion. As shown by FIG. 43, the transmitting portion 23 includes transmission signal amplifiers 231A, 231B, a coupler transformer 232 and the like. Further, FIG. 44 shows examples of detailed circuit diagrams of the detecting portions and the differential circuit. As shown by FIG. 44, the detecting portion 21 includes an amplifier 211 for an inverse phase and an input side of the inverse phase amplifier 211 is connected to the current transformer T21 via various kinds of capacitors and inductors. On the other hand, the detecting portion 22 includes an amplifier 221 for the same phase and an input side of the same phase amplifier 221 is connected to the current transformer T22 via various kinds of capacitors and inductors. Further, the differential circuit 24 includes an amplifier 241 and an input side of the amplifier 241 is connected to output sides of the inverse phase amplifier 211 and the same phase amplifier 221.

Figure 39:
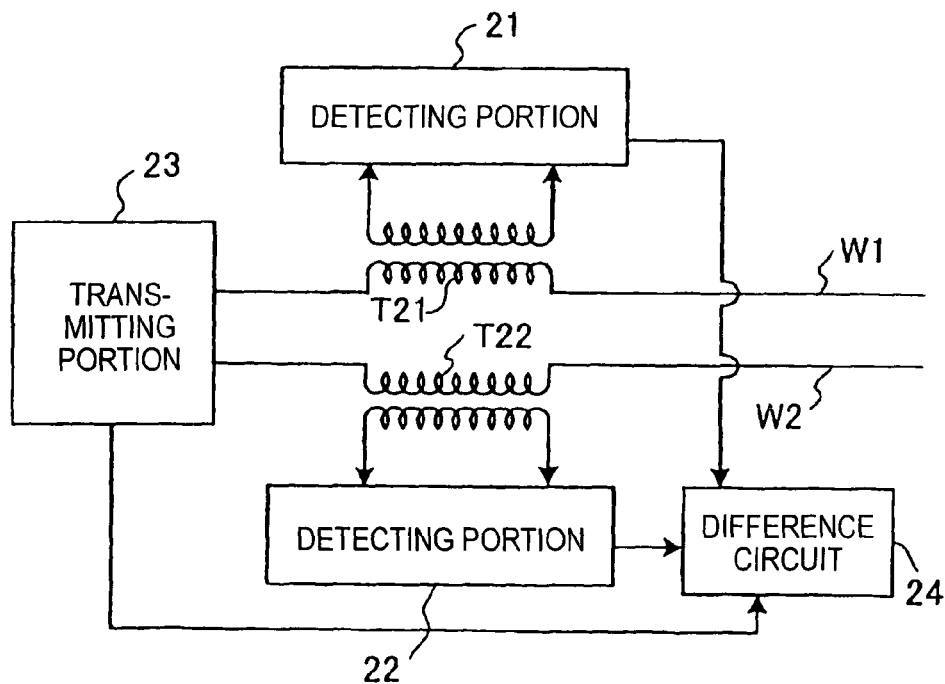
FIG. 39 is a view showing a first modified example of the line state detecting apparatus according to the tenth embodiment.

FIG. 39 shows a first modified example of the line state detecting apparatus according to the tenth embodiment. The first modified example is constructed by a constitution of connecting the transmitting portion 23 to the differential circuit 24 in the constitution of FIG. 38. In the constitution, the differential circuit 24 calculates a difference of currents of the forward line and the rearward line of the outputs detected by the first and the second detecting portions 21, 22, inputs a portion of the transmission signal transmitted from the transmitting portion 23 and compares phases of the current or the voltage of the transmission signal and the current or the voltage of the difference of the forward line and the rearward line in the conductors W1, W2 detected by the first and the second detecting portions 21, 22. Thereby, the direction of the common mode current can be detected along with amplitude of the unbalance component between the conductors W1, W2. Further, when the currents or the voltages of the transmission signal outputted from the transmitting portion 23 and the transmission lines, either or both of the current or the voltage in the conductor W1 detected by the first detecting portion 21 and the current or the voltage in the conductor W2 detected by the second detecting portion 22 may be used.

Further, the line state detecting apparatus of FIG. 39 may be constructed by a constitution of calculating a product of the difference of the currents or the voltages in the conductors W1, W2 detected by the first and the second detecting portions 21, 22 by the current or the voltage of the transmission signal outputted from the transmitting portion 23. Thereby, an amount of the common mode current between the conductors W1, W2 of the transmission lines can be calculated by the calculated value of the product and the direction of common mode current can be detected by a sign of the calculated value.

Figure 40:
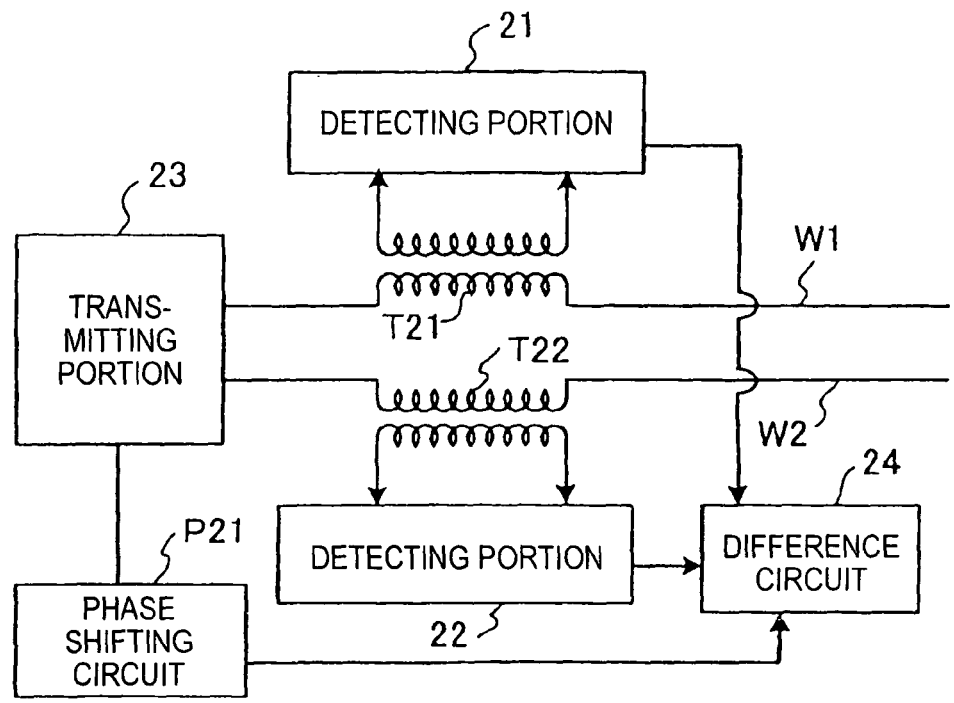
FIG. 40 is a view showing a second modified example of the line state detecting apparatus according to the tenth embodiment.

FIG. 40 shows a second modified example of the line state detecting apparatus according to the tenth embodiment. The second modified example is constructed by a constitution of including a phase shifting circuit P21 for inputting a portion of the transmission signal outputted from the transmitting portion 23 and shifting a phase of the current or the voltage of the transmission signal to output to the differential circuit 24 in the constitution of FIG. 38. The phase shifting circuit P21 may be either of a circuit of shifting the phase in analog by a delay element or the like and a circuit of executing a phase shifting processing in digital by a digital circuit. In the constitution, the phase shifting circuit P21 compensates for the phase by advancing or retarding the phase of the transmission signal outputted from the transmitting portion 23. The differential circuit 24 calculates a difference of currents of the forward line and the rearward line of the outputs detected by the first and the second detecting portions 21, 22, inputs the transmission signal the phase of which is compensated for by the phase shifting circuit P21 and calculates a product of the difference of the currents or the voltages of the conductors W1, W2 by the current or the voltage of the transmission signal. Thereby, the direction and the current value of the common mode current between the conductors W1, W2 of the transmission lines can accurately be detected.

Figure 41:
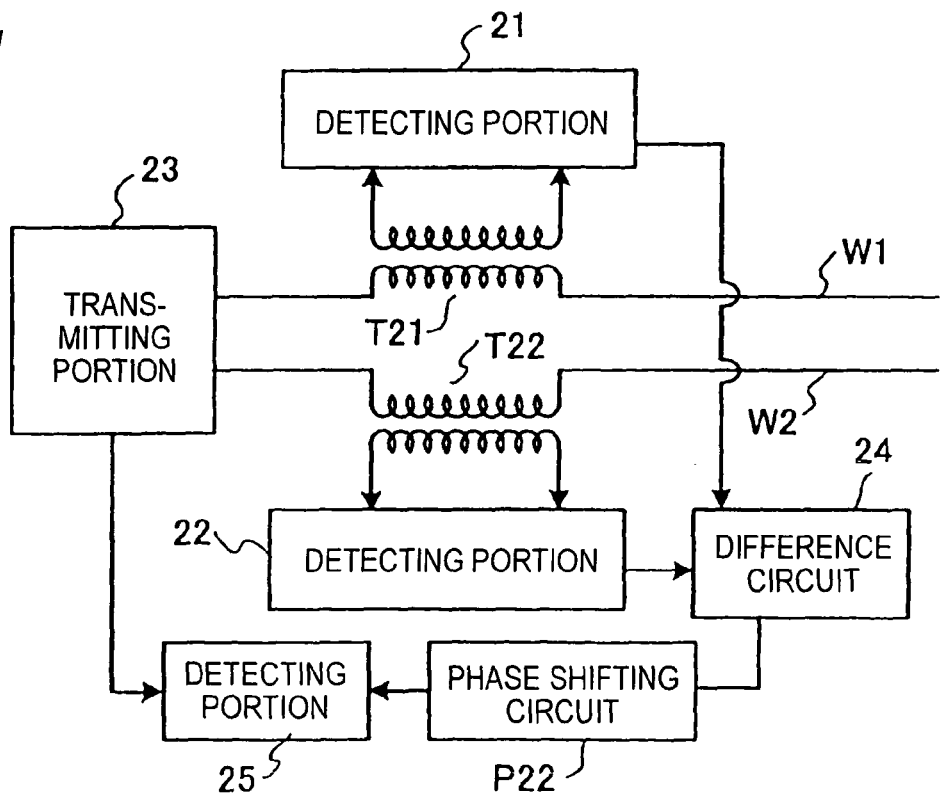
FIG. 41 is a view showing a third modified example of the line state detecting apparatus according to the tenth embodiment.

FIG. 41 shows a third modified example of the line state detecting apparatus according to the tenth embodiment. The third modified example is constructed by a constitution of including a phase shifting circuit P22 for shifting the phase of the difference of the respective outputs of the first and the second detecting portions 21, 22 calculated by the differential circuit 24 and a third detecting portion 25 for inputting portions of an output of the phase shifting circuit P22 and a portion of the transmission signal transmitted from the transmitting portion 23 and calculating a product thereof in the constitution of FIG. 38. The phase shifting circuit P22 may be either of a circuit of shifting the phase in analog by a delay element or the like and a circuit of executing a phase shifting processing in digital by a digital circuit. In the constitution, the phase shifting circuit P22 compensates for the phase by advancing or retarding the phase of the difference of the outputs detected by the first and the second detecting portions 21, 22 calculated by the differential circuit 24. The third detecting portion 25 calculates a product of the difference of the currents or the voltages between the conductors W1, W2 the phase of which is compensated for by the phase shifting circuit P22 by the current or the voltage of the transmission signal outputted from the transmitting portion 23. Thereby, the direction and the current value of the common mode current between the conductors W1, W2 of the transmission lines can accurately be detected.

According to the line state detecting apparatus of the tenth embodiment, by detecting the voltages on the secondary sides of the current transformers T21, T2, the primary sides of which are respectively inserted the conductors W1, W2 constituting the transmission lines in series therewith by the first and the second detecting portions 21, 22, the currents respectively flowing in the conductors W1, W2 can be calculated in a state of being separated from the transmission lines, and by calculating the difference of the currents of the forward line and the rearward line of the detected values by the differential circuit 24, the unbalance component between the conductors W1, W2 can be detected. According to the constitution, the detecting portions for detecting the unbalance component are provided in the form of being separated from the transmission lines and therefore, an influence on the transmission line by the detecting portions can be nullified and the unbalance component of the transmission lines can further accurately be detected.

Further, in the differential circuit 24, by comparing the phases of the current or the voltage of the unbalance component detected by the above-described constitution and the current or the voltage of the portion of the transmission signal outputted from the transmitting portion 23, or calculating the product of the both, the direction of the common mode current can be detected in the state of being separated from the transmission lines along with the value of the unbalance component between the conductors W1, W2 of the transmission lines. Further, by compensating for the phase of the current or the voltage of the transmission signal outputted from the transmitting portion 23, or the phase of the current or the voltage between the conductors W1, W2 of the transmission lines calculated by the differential circuit 24 by the phase shifting circuit and calculating the product, the direction and the absolute value of the unbalance component of the transmission lines can further accurately be detected in the separated state.

Figure 45:
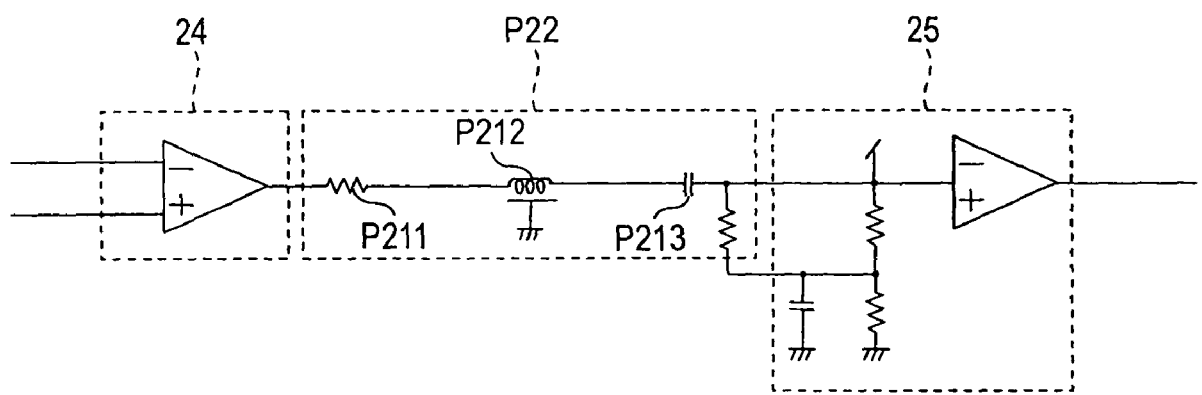
FIG. 45 shows an example of a detailed circuit diagram of the phase shifting circuit.

Here, a detailed circuit constitution of the phase shifting circuit will be explained. FIG. 45 shows an example of a detailed circuit diagram of the phase shifting circuit. The phase shifting circuit P22 is connected between the differential circuit 24 and the detecting portion 25. Further, only simple constitutions of amplifiers or the like are shown in the differential circuit 24 and the detecting portion 25 shown in FIG. 45. As shown by FIG. 45, the phase shifting circuit P22 includes a resister P221, an inductance P212, and a capacitor P213 and the like and constitutes a delay line by connecting these in series.

Eleventh Embodiment

Figure 42:
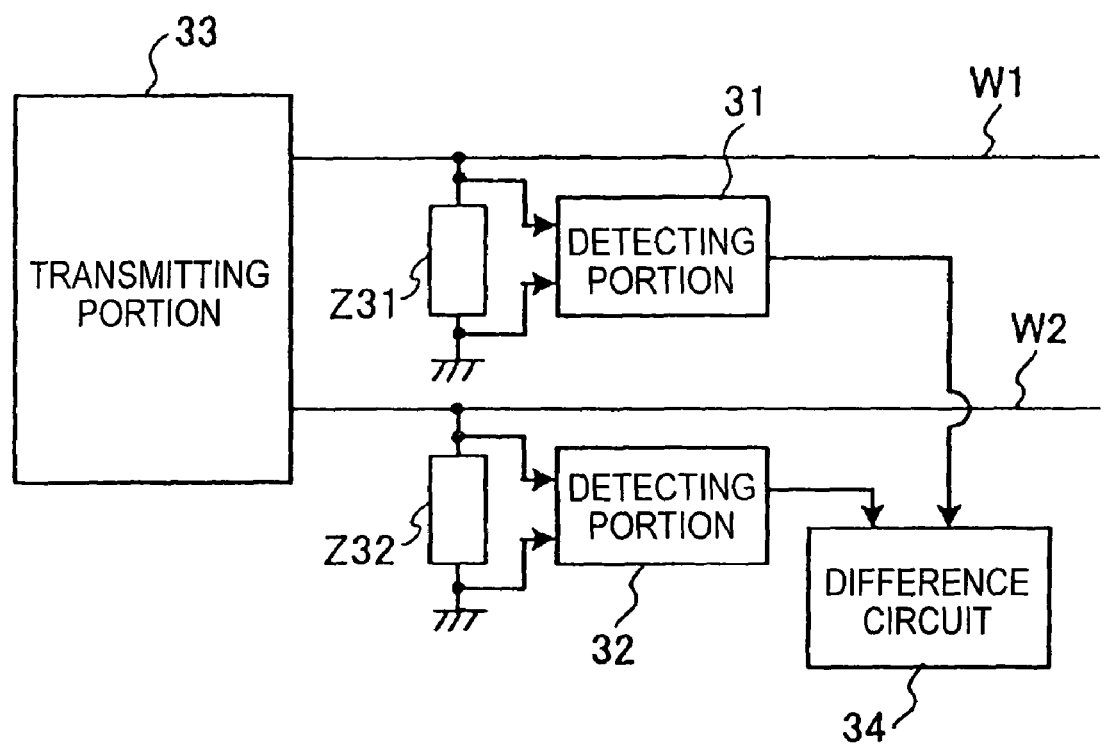
FIG. 42 is a view showing a constitution of a line state detecting apparatus according to an eleventh embodiment of the invention.

FIG. 42 is a view showing a constitution of a line state detecting apparatus according to an eleventh embodiment of the invention. The line state detecting apparatus of the embodiment includes, in transmission lines on a forward line side and a rearward line side comprising the pair of conductors W1, W2 connected to a transmitting portion 33, impedances Z31, Z32 ends on one side of which are connected to respectives thereof. Ends on other side of the impedances Z31, Z32 are grounded. Further, the line state detecting apparatus is constructed by a constitution of including a first detecting portion 31 and a second detecting portion 32 for respectively detecting voltages of the impedances Z31, Z32 and a differential circuit 34 for detecting common mode components of respective outputs of the first detecting portion 31 and the second detecting portion 32. Further, as the differential circuit 34, any circuit can be used so far as the circuit is a circuit including an adding circuit, a subtracting circuit or the like and can detect a difference of the voltages at the conductors W1, W2.

In the constitution, the first detecting portion 31 and the second detecting portion 32 can respectively detect voltages of the conductors W1, W2 relative to a predetermined reference voltage (ground potential) by respectively detecting voltages across both ends of the impedances Z31, Z32. Further, the differential circuit 34 can detect common mode voltage (unbalance voltage) components between the conductors W1, W2, that is, an unbalance component of a power transmitted from the transmitting portion 33 by calculating the common phase components of the outputs of the first detecting portion 31 and the output of the second detecting portion 32.

According to the line state detecting apparatus of the eleventh embodiment, the respective voltages of the conductors W1, W2 relative to the predetermined reference potential can be detected by detecting the voltages across both ends of the impedances Z31, Z32 the ends on one side of which are connected to respectives of the conductors W1, W2 constituting the transmission lines and the unbalance component between the conductors W1, W2 can be detected by calculating the common mode components of the detected values by the differential circuit 34.

Further, in the above-described first through eleventh embodiments, there may be constructed a constitution of detecting the unbalance component between the conductors W1, W2 in consideration of a timing of outputting the transmission signal by using the transmission signal transmitted from the transmitting portion. For example, when the transmission signal is not outputted, the detected output of the unbalance component between the conductors W1, W2 when the transmission signal is not outputted can be excluded by stopping to operate the detecting portion or the differential circuit or switching off the output of the differential circuit.

As described above, according to the embodiments, the balanced state of the transmission lines in the balanced transmission system can be detected and the balanced state of the transmission lines can be controlled and the degree of balance can be promoted by controlling the level of the transmission signal transmitted to the transmission lines based on the result of the detection. Thereby, the power leaked from the transmission lines to outside can be reduced and a deterioration in the characteristic of transmitting data and an interference to other portion or the like can be restrained. For example, a further significant effect is achieved when the embodiment is applied to the balanced transmission system of a power line communication system using a power line for the transmission line.

This application is based upon and claims the benefit of priority of Japanese Patent Application Nos. 2004-121455 and 2004-121456 both filed on Apr. 16, 2004, the contents of which are incorporated herein by reference in its entirety.

The invention achieves an effect of capable of detecting the balanced state of the transmission lines in the balanced transmission system for transmitting data by using a pair of conductors and achieves an effect for capable of controlling the balanced state of the transmission lines based on the detection result and capable of promoting the degree of balance in the balanced transmission system, and is useful for the line state detecting apparatus in the balanced transmission system as well as the transmitter and the receiver of the balanced transmission system having the same.

What is claimed is:

1. A line state detecting apparatus for detecting a state of a transmission line in a balanced transmission system for transmitting data by using a pair of conductors, said line state detecting apparatus comprising:
   a first current transformer including primary windings and secondary windings, the primary windings of the first current transformer being inserted in series to one of the pair of conductors;
   a second current transformer including primary windings and secondary windings, the primary windings of the second current transformer being inserted in series to the other one of the pair of conductors, and the secondary windings of the first current transformer and the second current transformer being connected in series with each other by a line which is different from the pair of conductors so as to cancel currents or voltages in both the first current transformer and the second current transformer; and
   a detector for detecting currents or voltages of the secondary windings as an unbalanced component.

2. The line state detecting apparatus according to claim 1, wherein the detector compares phases of a transmission signal outputted to the conductors and a difference of a current or a voltage in a forward line and a rearward line of the conductors.

3. The line state detecting apparatus according to claim 1, wherein the detector calculates a product of a transmission signal by a difference of a current or a voltage in a forward line and a rearward line of the conductors.

4. The line state detecting apparatus according to claim 1, further comprising:
   a phase shifter for controlling a phase of at least one of a transmission signal outputted to the conductors and a difference of a current or a voltage of in a forward line and a rearward line of the conductors.

* * * * *